US012728585B2

(12) United States Patent
Yoshimatsu et al.

(10) Patent No.: US 12,728,585 B2
(45) Date of Patent: Sep. 8, 2026

(54) LINK MECHANISM FOR RESIN-FILM STRETCH APPARATUS, RESIN-FILM STRETCH APPARATUS, AND METHOD OF MANUFACTURING RESIN FILM

(71) Applicant: THE JAPAN STEEL WORKS, LTD., Tokyo (JP)

(72) Inventors: Naoaki Yoshimatsu, Tokyo (JP); Ichiro Nakajima, Tokyo (JP); Shohei Yamashita, Tokyo (JP)

(73) Assignee: THE JAPAN STEEL WORKS, LTD., Tokyo (JP)

(*) Notice: Subject to any disclaimer, the term of this patent is extended or adjusted under 35 U.S.C. 154(b) by 342 days.

(21) Appl. No.: 18/275,056

(22) PCT Filed: Sep. 8, 2021

(86) PCT No.: PCT/JP2021/033062
§ 371 (c)(1),
(2) Date: Jul. 31, 2023

(87) PCT Pub. No.: WO2022/168358
PCT Pub. Date: Aug. 11, 2022

(65) Prior Publication Data
US 2024/0123674 A1 Apr. 18, 2024

(30) Foreign Application Priority Data
Feb. 4, 2021 (JP) ................................ 2021-016221

(51) Int. Cl.
*B29C 55/16* (2006.01)
*B29C 55/18* (2006.01)
(Continued)

(52) U.S. Cl.
CPC ............ *B29C 55/165* (2013.01); *B29C 55/16* (2013.01); *B29C 55/20* (2013.01); *B29C 55/18* (2013.01); *B29L 2007/00* (2013.01)

(58) Field of Classification Search
None
See application file for complete search history.

(56) References Cited

U.S. PATENT DOCUMENTS 4,558,496 A * 12/1985 Cramer ................ B29C 55/165 26/79
4,674,159 A * 6/1987 Sclater .................... B29C 55/20 26/93
(Continued)

FOREIGN PATENT DOCUMENTS

CN 102529084 * 7/2012
CN 210682976 * 6/2020
(Continued)

OTHER PUBLICATIONS

International Search Report for International Patent Application No. PCT/JP2021/033062, Oct. 12, 2021.
(Continued)

*Primary Examiner* — Jeffrey M Wollschlager
(74) *Attorney, Agent, or Firm* — Potomac Law Group, PLLC

(57) ABSTRACT

Performance of a link apparatus is improved. A link mechanism (11C) included in the link apparatus includes, for example, a roller (110A) fixed to a link shaft (40A) via a bracket (100A), the roller (110A) being contactable with a link retainer (70).

6 Claims, 16 Drawing Sheets

(51) Int. Cl.

| | |
|---|---|
| ***B29C 55/20*** | (2006.01) |
| ***B29L 7/00*** | (2006.01) |

(56) References Cited

U.S. PATENT DOCUMENTS

| | | | | |
|---|---|---|---|---|
| 10,723,062 | B2 * | 7/2020 | Marchante | B29C 55/16 |
| 2019/0039282 | A1 * | 2/2019 | Unterreiner | B29C 55/20 |
| 2021/0108347 | A1 * | 4/2021 | Bauer | D06C 3/025 |
| 2022/0176595 | A1 | 6/2022 | Yoshimatsu et al. | |

FOREIGN PATENT DOCUMENTS

| | | | |
|---|---|---|---|
| JP | 2004-155138 | A | 6/2004 |
| JP | 2005-335324 | A | 12/2005 |
| JP | 2012121259 | * | 6/2012 |
| JP | 2020-175576 | A | 10/2020 |

OTHER PUBLICATIONS

Office Action issued Jun. 17, 2025, in Chinese Patent Application No. 202180092621.5.

* cited by examiner 5
17
21
11
L
13
20C
P
14
TD
MD
20B
L1
20A
9
15
16
10
(10L)
(10R)
8

LINK MECHANISM FOR RESIN-FILM STRETCH APPARATUS, RESIN-FILM STRETCH APPARATUS, AND METHOD OF MANUFACTURING RESIN FILM

TECHNICAL FIELD

The prevent invention relates to a link mechanism for a resin-film stretch apparatus, a resin-film stretch apparatus, and a technique of manufacturing a resin film.

BACKGROUND ART

As stretch apparatuses, there are stretch apparatuses each configured to allow for longitudinal stretching and transverse stretching in directions orthogonal to each other. A method of sequentially performing the longitudinal stretching and the transverse stretching using such a stretch apparatus is called a sequential biaxial stretching method. On the other hand, a method of simultaneously performing the longitudinal stretching and the transverse stretching is called a simultaneous biaxial stretching method. Compared to the sequential stretching method, the simultaneous biaxial stretching method is advantageous in that scratches are less likely to occur, the application range of raw materials is wider, the stretching is allowed even at a large crystallization rate, the uniformity of physical properties in the longitudinal and transverse directions is higher, and others.

For example, Japanese Patent Application Laid-open Publication No. 2004-155138 (Patent Document 1) describes a stretch apparatus for a sheet-shaped article, the apparatus being configured to stretch the sheet-shaped article in a transverse direction by causing sprockets on the inlet and outlet sides of the sheet-shaped article to drive an endless link apparatus in which a plurality of equal-length link apparatuses having a collapsible ruler form are placed on both ends of the sheet-shaped article, and causing guide rails formed of guides arranged to be divergent in the travel direction to guide the article.

RELATED ART DOCUMENTS

Patent Documents

Patent Document 1: Japanese Patent Application Laid-open Publication No. 2004-155138

SUMMARY OF THE INVENTION

Problems to be Solved by the Invention

For example, a stretch apparatus of stretching a film includes a link apparatus having a link mechanism for holding and stretching the film. This link mechanism includes a film holder for holding a film. Then, when a guide plate is pressed against the film holder to release the film holder, a film is inserted into the released film holder. As a result, the film can be held by the film holder included in the link mechanism.

In this respect, when a guide plate is pressed against the film holder to release the film holder, a moment may occur in the link mechanism, resulting in risk of the lifting of the link mechanism due to the moment. For this reason, a measure for suppressing the lifting of the link mechanism is adopted. However, existing measures have room for improvement. That is, as a measure for suppressing the lifting of the link mechanism, further devisal has been desired.

Means for Solving the Problems

A link mechanism for a resin-film stretch apparatus in one embodiment includes a roller fixed to a link shaft via a bracket, the roller being contactable with a link retainer.

A resin-film stretch apparatus in one embodiment includes a link apparatus having a roller.

According to a method of manufacturing a resin film in one embodiment, a resin film is manufactured by a link apparatus capable of suppressing lifting of a link mechanism caused by a moment occurring in the link mechanism, by causing a roller to be in contact with a link retainer.

Effects of the Invention

According to one embodiment, a performance of a link apparatus can be improved.

BRIEF DESCRIPTIONS OF THE DRAWINGS

FIG. 8(*a*) is a diagram showing a closed state of a link mechanism, and FIG. 8(*b*) shows an open state of the link mechanism.

DETAILED DESCRIPTION OF PREFERRED EMBODIMENTS

The same components are denoted by the same reference signs in principle throughout all the drawings for describing the embodiments, and the repetitive description thereof will be omitted. Note that hatching may be used even in a plan view so as to make the drawings easy to see.

First Embodiment

Film Manufacturing System

Figure 1:
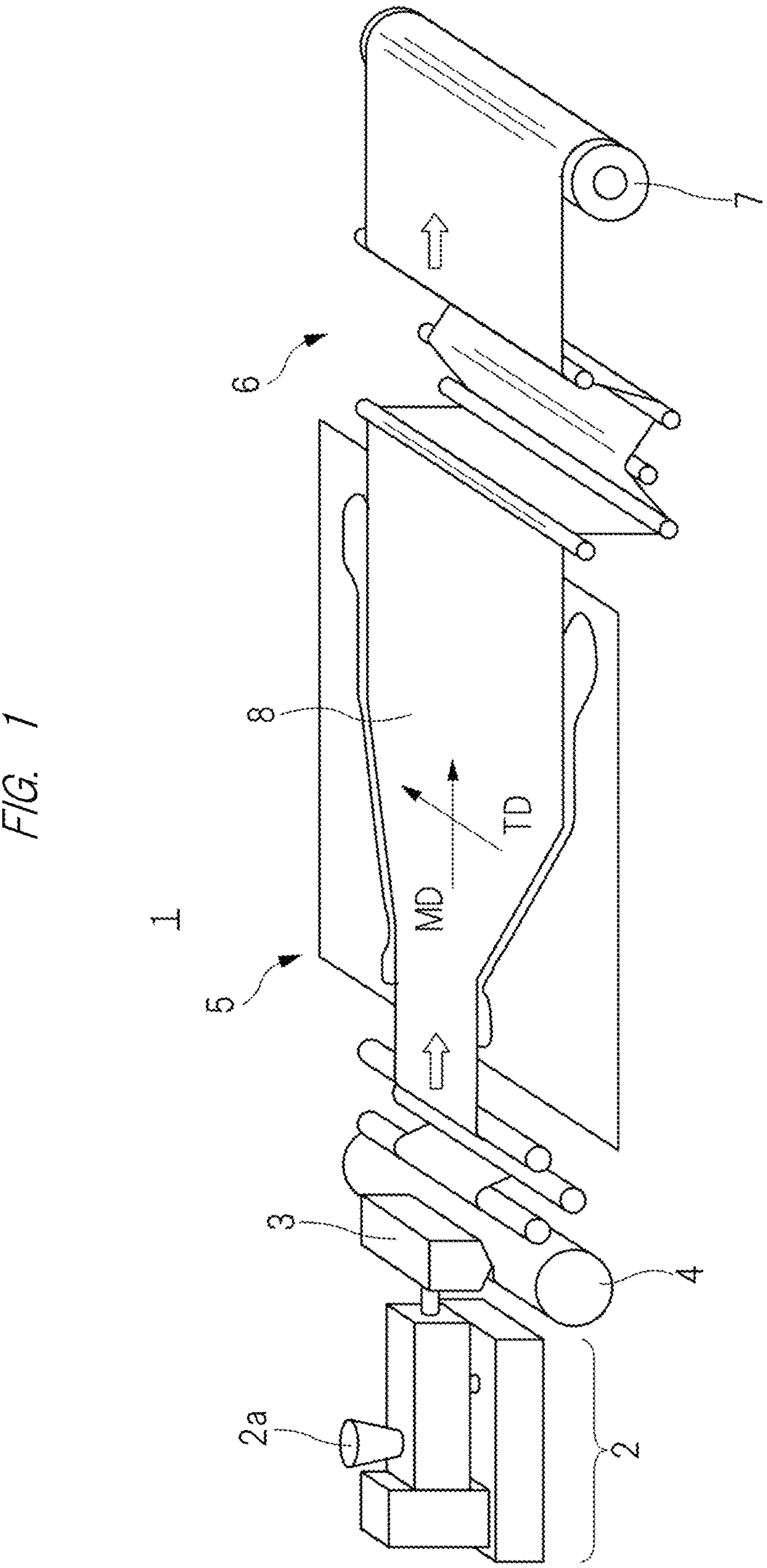
FIG. 1 is a schematic diagram showing a configuration of a film manufacturing system including a stretch apparatus.

FIG. 1 is a schematic diagram showing a configuration of a film manufacturing system including a stretch apparatus.

In FIG. 1, the film manufacturing system 1 includes an extruder 2, a T-die 3, a raw fabric cooler 4, a stretch apparatus 5, a reeler 6, and a winder 7.

In the film manufacturing system 1, a film is manufactured as, for example, described below.

First, a raw material is supplied to a raw material supply unit 2*a* of the extruder 2. The raw material supplied to the extruder 2 is made of a resin material (e.g., a pelletized thermoplastic resin material), an additive, and the like. The raw material supplied to the extruder 2 is transported while being kneaded. Specifically, the raw material supplied to the extruder 2 is melted and kneaded inside the extruder 2 while being transported forward by rotation of a screw. The raw material (kneaded material) kneaded by the extruder 2 is supplied to the T-die 3. The kneaded material supplied to the T-die 3 is extruded from a slit of the T-die 3 toward the raw fabric cooler 4. The kneaded material supplied from the extruder 2 to the T-die 3 passes through the T-die 3, and thus, is formed into a predetermined shape (here, film shape).

The kneaded material extruded from the T-die 3 is cooled in the raw fabric cooler 4, and becomes a film 8. The film 8 is a solidified resin film. More specifically, the film 8 is a thermoplastic resin film. From the T-die 3, the film 8 is continuously extruded. As a result, the film 8 is continuously supplied to the stretch apparatus 5.

The film 8 supplied to the stretch apparatus 5 is stretched in a MD direction and a TD direction by the stretch apparatus 5. The film 8, which has undergone a stretching process (drawing process) by the stretch apparatus 5, is transported to the winder 7 through the reeler 6, and is wound up by the winder 7. The film 8 wound by the winder 7 is cut as necessary. The film manufacturing system 1 shown in FIG. 1 manufactures the film as described above. However, the film manufacturing system 1 is variously variable depending on the characteristics of the film to be manufactured, etc. For example, in some cases, an extraction bath is placed near the reeler 6 shown in FIG. 1, and a plasticizer (e.g., paraffin, etc.) contained in the film 8 is removed.

The stretch apparatus 5, which is a constituent element of the film manufacturing system 1, stretches the film 8 in the MD direction and the TD direction while transporting the film 8 in the MD direction. Here, the MD (Machine Direction) direction is the transport direction of the film 8. In addition, the TD (Transverse Direction) direction is the direction intersecting the transport direction of the film 8.

Thus, in the following description, the MD direction is sometimes referred to as "transport direction" or "longitudinal direction", and the TD direction is sometimes referred to as "transverse direction". The MD direction and the TD direction are directions intersecting each other. More specifically, they are directions orthogonal to each other. That is, the stretch apparatus 5 shown in FIG. 1 is a stretch apparatus capable of simultaneously stretching the film 8 in two mutually intersecting directions while transporting the film 8, and is called a "simultaneous biaxial stretch apparatus".

Configuration of Stretch Apparatus

Next, the configuration of the stretch apparatus 5, which is the constituent element of the film manufacturing system 1, will be described.

Figure 2:
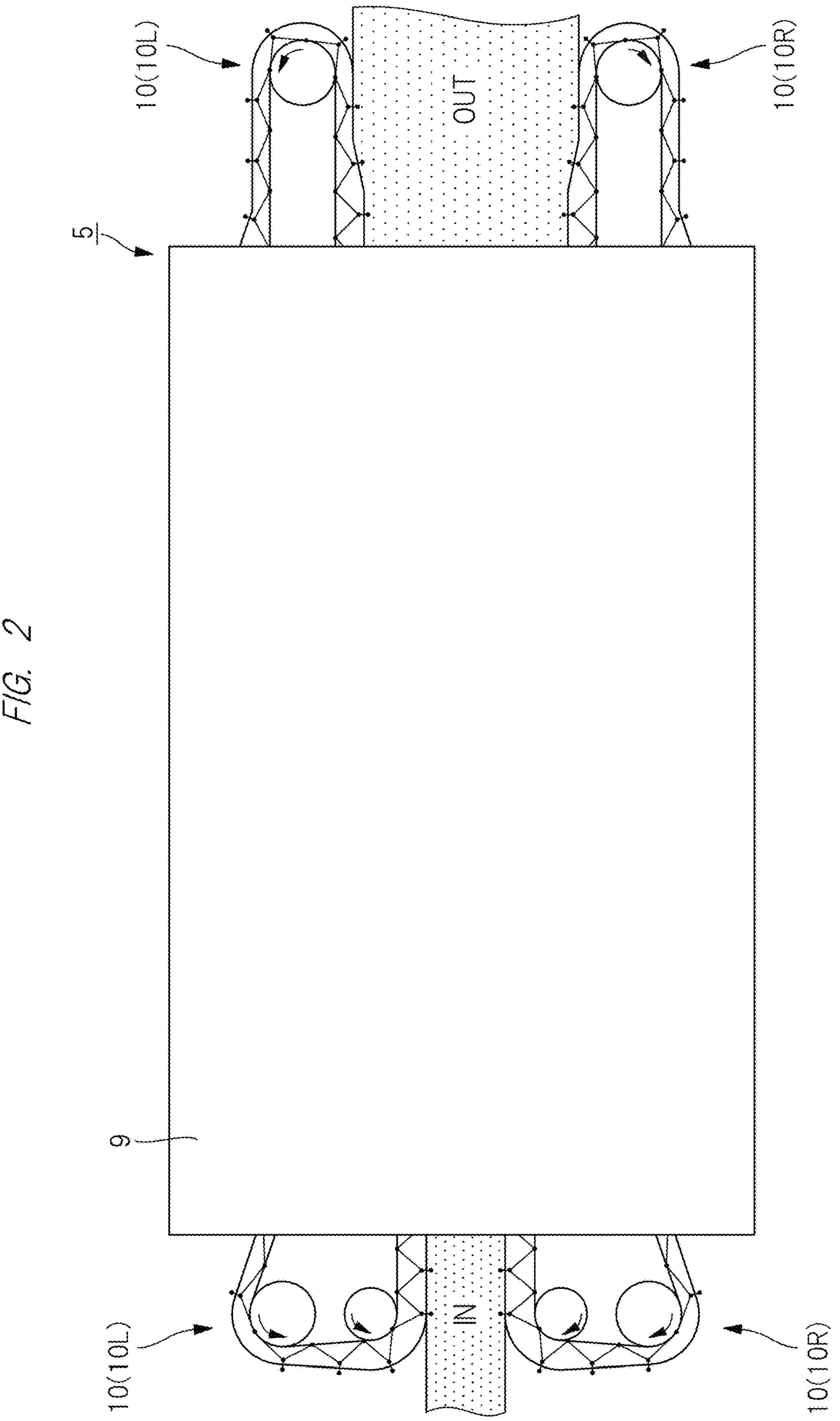
FIG. 2 is a plan view schematically showing a structure of a stretch apparatus.
Figure 3:
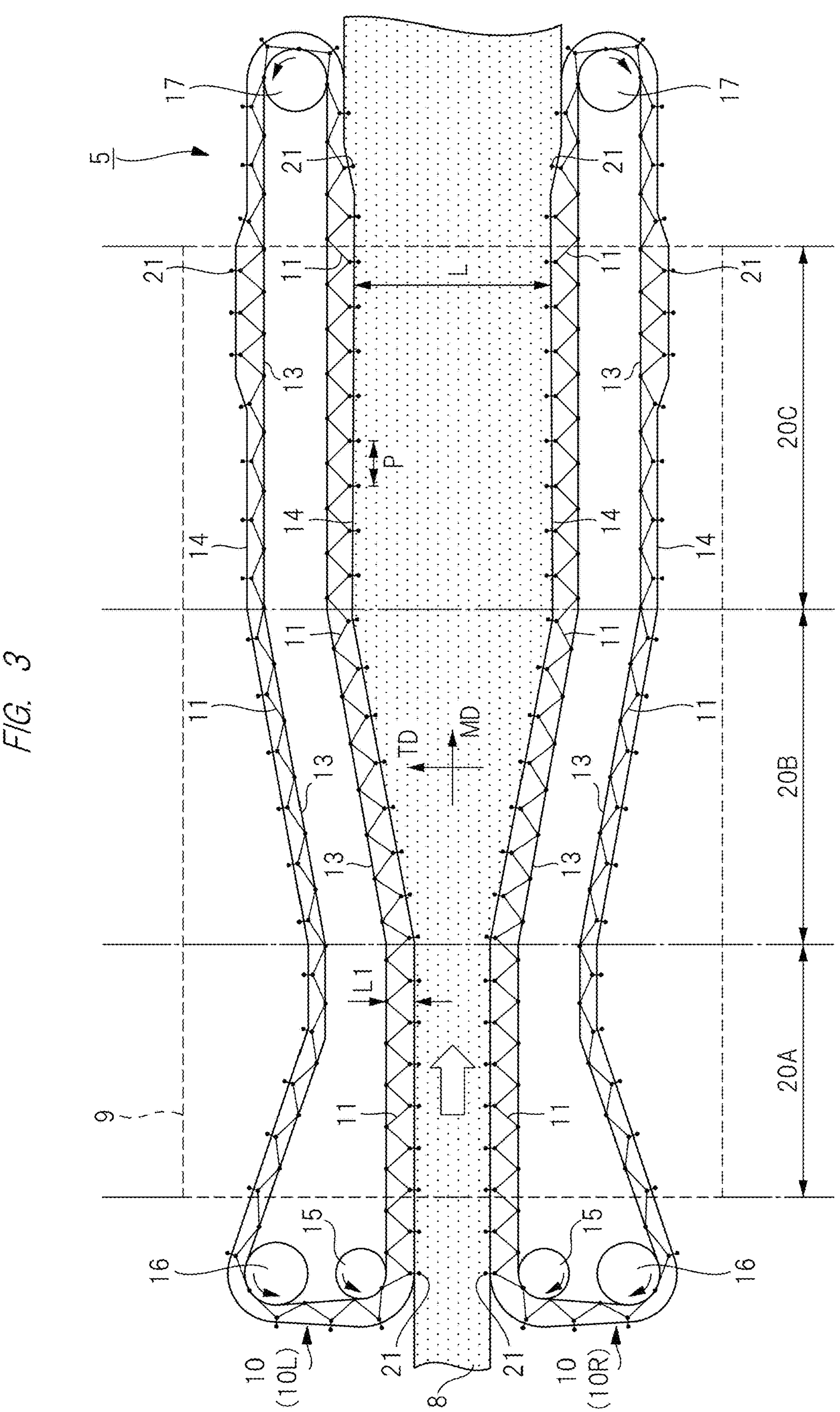
FIG. 3 is a plan view schematically showing a structure of a stretch apparatus.

FIG. 2 and FIG. 3 are each a plan view schematically showing the structure of the stretch apparatus.

In FIG. 2 and FIG. 3, the stretch apparatus 5 includes a pair of link apparatuses 10. The pair of link apparatuses 10 are spaced apart from each other in plan view. In the following description, the pair of link apparatuses 10 may be distinguished from each other so that one of the pair of link apparatuses 10 is referred to as "link apparatus 10R" while the other of the pair of link apparatuses 10 is referred to as "link apparatus 10L".

In FIG. 2 and FIG. 3, the link apparatus 10R is placed on the right side (R-side) with respect to the transport direction (MD direction), and the link apparatus 10L is placed on the left side (L-side) with respect to the transport direction (MD direction). The link apparatus 10R and the link apparatus 10L are spaced apart from each other in the TD direction, and face each other across the film 8 in the TD direction. The film 8 is transported in the MD direction while being placed in a space between the link apparatus 10R and the link apparatus 10L. In other words, the space between the link apparatus 10R and the link apparatus 10L facing each other functions as a transport unit for transporting the film 8.

In FIG. 3, the stretch apparatus 5 is sectioned into three regions 20A, 20B, and 20C along the transport direction (MD direction). The region 20A is a preheating region, the region 20B is a stretching region, and the region 20C is a heat fixing region. The region 20A, the region 20B, and the region 20C are side by side in the transport direction (MD direction) in this order.

In the stretch apparatus 5, an inlet (a part indicated as "IN" in FIG. 2 to which the film 8 is transported in exists on the left side of the region 20A.

In addition, in the stretch apparatus 5, an outlet (a part indicated as "OUT" in FIG. 2 from which the film 8 is transported out exists on the right side of the region 20C. And, the region 20B where the stretching process is performed exists between the region 20A having the inlet and the region 20C having the outlet.

The heat process unit 9 shown in FIG. 2 covers part of the region 20A, the entire region 20B, and part of the region 20C. In addition, the heat process unit 9 covers the central part of the link apparatus 10R and that of the link apparatus 10L, and heats the film 8 transported by the link apparatus 10R and the link apparatus 10L. The heat process unit 9 in the present embodiment is made of, for example, an oven that can heat the film 8 at a desired temperature. The film 8 passes through the oven serving as the heat process unit 9 while being held by the link apparatus 10R and the link apparatus 10L.

As shown in FIG. 2 and FIG. 3, each of the link apparatus 10R and the link apparatus 10L includes a plurality of link mechanisms 11 connected to form an endless chain, and each link mechanism 11 includes a film holder 21 called a clip which is a jig holding the film 8. The film 8 is held by the film holder 21 included in each link mechanism 11 configuring the link apparatus 10R and the film holder 21 included in each link mechanism 11 configuring the link apparatus 10L. That is, one side (R-side/right side) of the film 8 is held by a plurality of film holders 21 included in the link apparatus 10R, and the other side (L-side/left side) of the film 8 is held by a plurality of film holders 21 included in the link apparatus 10L.

Each of the link apparatus 10R and the link apparatus 10L further includes a rail 13 and a rail 14 which are a pair of rails placed on a support stage (bed) in addition to the plurality of link mechanisms 11. In each of the link apparatus 10R and the link apparatus 10L, the rail 13 is placed on an inner circumference side, and the rail 14 is placed on an outer circumference side.

Thus, the rail 13 is sometimes referred to as "inner rail", while the rail 14 is sometimes referred to as "outer rail". In addition, the rail 13 is sometimes also referred to as "standard rail" or "SP rail" while the rail 14 is sometimes also referred to as "MD rail".

The rail 13 and the rail 14 included in each of the link apparatus 10R and the link apparatus 10L are annularly arranged over the region 20A, the region 20B, and the region 20C. For example, the rail 13 and the rail 14 are turned back in the region 20A having the inlet to which the film 8 is transported in and is also turned back in the region 20C having the outlet from which the film 8 is transported out, to be annularly arranged over the region 20A, the region 20B, and the region 20C.

Three sprockets 15, 16, and 17 are provided on the inner side of the rail 13 of the link apparatus 10R. Similarly, three sprockets 15, 16, and 17 are provided on the inner side of the rail 13 of the link apparatus 10L. The sprocket 15 and the sprocket 16 in each of the link apparatus 10R and the link apparatus 10L are placed on the outer side of the region 20A, and the sprocket 17 in each of the link apparatus 10R and the link apparatus 10L is placed on the outer side of the region 20C. Nevertheless, the sprocket 15 and the sprocket 16 are placed outside the heat process unit 9 that covers part of the region 20A. In addition, the sprocket 17 is placed on the outer side of the heat process unit 9 that covers part of the region 20C. That is, the sprocket 15, the sprocket 16, and the sprocket 17 in each of the link apparatus 10R and the link apparatus 10L are placed on the outer side of the oven serving as the heat process unit 9.

The plurality of link mechanisms 11 included in each of the link apparatus 10R and the link apparatus 10L are placed on the rail 13 and the rail 14 so as to be movable along the rail 13 and the rail 14. The sprocket 15, the sprocket 16, and the sprocket 17 of the link apparatus 10R shown in FIG. 3 engage with the plurality of link mechanisms 11 of the link apparatus 10R. Therefore, when the sprocket 15, the sprocket 16, and the sprocket 17 rotate, a driving force acts on the plurality of link mechanisms 11 included in the link apparatus 10R, and these link mechanisms 11 move (run) along the rail 13 and the rail 14 of the link apparatus 10R. The sprocket 15, the sprocket 16, and the sprocket 17 of the link apparatus 10L shown in FIG. 3 engage with the plurality of link mechanisms 11 included in the link apparatus 10L. Therefore, when the sprocket 15, the sprocket 16, and the sprocket 17 rotate, a driving force acts on the plurality of link mechanisms 11 included in the link apparatus 10L, and these link mechanisms 11 move (run) along the rail 13 and the rail 14 of the link apparatus 10L. That is, the rail 13 and the rail 14 included in each of the link apparatuses 10R and 10L are guide rails for allowing the plurality of link mechanisms 11 to move (run) in a predetermined direction.

In the following description, a side of each of the link apparatus 10R and the link apparatus 10L shown in FIG. 3, the side facing the film 8, is sometimes referred to as "film side", and a side of the same opposite to the film side is sometimes referred to as "return side". That is, the "film side" is the side of the same where the plurality of link mechanisms 11 move from the inlet (IN) toward the outlet (OUT) in a state in which the film holder 21 holds the film 8, and the "return side" is the side of the same opposite to the film side, where the plurality of link mechanisms 11 move from the outlet (OUT) toward the inlet (IN) in a state in which the film holders 21 does not hold the film 8.

Of the plurality of link mechanisms 11, a pitch P (sometimes referred to as "link pitch") between the link mechanisms 11 adjacent to each other varies depending on a distance L1 between the rail 13 and the rail 14. In other words, by adjusting the distance L1 between the rail 13 and the rail 14, the pitch P between the adjacent link mechanisms 11 can be adjusted.

For example, although described in detail later, the smaller the distance L1 between the rail 13 and the rail 14 is, the larger the pitch P between the link mechanisms 11 adjacent to each other is. In other words, the larger the distance L1 between the rail 13 and the rail 14 is, the smaller the pitch P between the link mechanisms 11 adjacent to each other is. Based on this, the operation of the stretch apparatus 5 will be described below.

Operation of Stretch Apparatus

The film 8 supplied from the raw fabric cooler 4 to the stretch apparatus 5 is held at the inlet of the stretch apparatus by the link apparatus 10R and the link apparatus 10L. Specifically, the film 8 is held by the film holder 21 included in the link mechanism 11 of each of the link apparatus 10R and the link apparatus 10L shown in FIG. 2 and FIG. 3. More specifically, one widthwise side of the film 8 is held by the film holder 21 included in the link mechanism 11 of the link apparatus 10R, and the other widthwise side of the film 8 is held by the film holder 21 included in the link mechanism 11 of the link apparatus 10L.

Along with the movement of the link mechanisms 11 including the film holders 21, the film 8 held by the film holders 21 on both widthwise sides is transported from the inlet toward the outlet of the stretch apparatus 5, and passes through the region 20A (preheating region), the region 20B (stretching region), and the region 20C (heat fixing region) in this order. The film 8 is stretched in the MD direction and the TD direction in the course of passing through the region 20B (stretching region). Subsequently, the film 8 passes through the region 20C (heat fixing region), reaches the outlet, and is removed from the film holders 21. The film 8 removed from the film holders 21 is transported to the reeler 6, and is then transported from the reeler 6 to the winder 7.

As shown in FIG. 3, in the region 20A (preheating region), the distance L (that is a spacing distance in the TD direction) between the link apparatus 10R and the link apparatus 10L is almost constant. Accordingly, in the region 20A, a stretching process in the TD direction is not applied to the film 8. Therefore, in the region 20A, the width (that is a dimension in the TD direction) of the transported film 8 does not change, and remains constant.

In addition, in the region 20A, the distance L1 between the rail 13 and the rail 14 on the film side of the link apparatus 10R is almost constant. Accordingly, in the region 20A, the pitch P between the link mechanisms 11 on the film side of the link apparatus 10R is almost constant, and, therefore, the pitch between the film holders 21 on the film side of the link apparatus 10R is also almost constant. In addition, in the region 20A, the distance L1 between the rail 13 and the rail 14 on the film side of the link apparatus 10L is almost constant. Accordingly, in the region 20A, the pitch P between the link mechanisms 11 on the film side of the link apparatus 10L is almost constant, and, therefore, the pitch between the film holders 21 on the film side of the link apparatus 10L is also almost constant. As a result, in the region 20A, the stretching process in the MD direction is not applied to the film 8. That is, in the region 20A, no stretching process is applied to the film 8 in neither the TD direction nor the MD direction.

Next, the operation of the stretch apparatus 5 in the region 20B will be described.

In the region 20B, the closer to the transport direction (MD direction) the film is, the larger the distance L (that is the distance in the TD direction) between the link apparatus 10R and the link apparatus 10L is. Accordingly, in the region 20B, the closer to the transport direction (MD direction) the film 8 is, the more the drawing and stretching of the film 8 in the TD direction is. In other words, in the region 20B, the closer to the transport direction (MD direction) the film is, the larger the width (that is the dimension in the TD direction) of the film 8 is.

In addition, in the region 20B, the closer to the transport direction (MD direction) the film is, the smaller the distance L1 between the rail 13 and the rail 14 on the film side of the link apparatus 10R is, and the smaller the distance L1 between the rail 13 and the rail 14 on the film side of the link apparatus 10L also is. Accordingly, in the region 20B, the closer to the transport direction (MD direction) the film is, the larger the pitch P between the link mechanisms 11 on the film side of the link apparatus 10R is, and, accordingly, the larger the pitch between the film holders 21 on the film side of the link apparatus 10R also is. In addition, in the region 20B, the closer to the transport direction (MD direction) the film is, the larger the pitch P between the link mechanisms 11 on the film side of the link apparatus 10L is, and, accordingly, the larger the pitch between the film holders 21 on the film side of the link apparatus 10L also is. As a result, in the region 20B, the closer to the transport direction (MD direction) the film is, the more the drawing and stretching of the film 8 in the MD direction is.

For this reason, in the region 20B, the closer to the transport direction (MD direction) the film is, the more the drawing and stretching of the film 8 in the TD direction and the MD direction is. That is, in the region 20B, the stretching process in the TD direction and the MD direction is applied to the film 8.

Next, the operation of the stretch apparatus 5 in the region 20C will be described.

In the region 20C, the distance L (that is a distance in the TD direction) between the link apparatus 10R and the link apparatus 10L is almost constant. Accordingly, in the region 20C, the stretching process in the TD direction is not applied to the film 8. Therefore, in the region 20C, the width (that is a dimension in the TD direction) of the transported film 8 does not change, and remains constant.

In addition, in the region 20C, the distance L1 between the rail 13 and the rail 14 on the film side of the link apparatus 10R is almost constant. Accordingly, in the region 20C, the pitch P between the link mechanisms 11 on the film side of the link apparatus 10R is almost constant, and, therefore, the pitch between the film holders 21 on the film side of the link apparatus 10R is also almost constant. In addition, in the region 20C, the distance L1 between the rail 13 and the rail 14 on the film side of the link apparatus 10L is almost constant. Accordingly, in the region 20C, the pitch P between the link mechanisms 11 on the film side of the link apparatus 10L is almost constant, and, therefore, the pitch between the film holders 21 on the film side of the link apparatus 10L is also almost constant. As a result, in the region 20C, the stretching process in the MD direction is not applied to the film 8. That is, in the region 20C, no stretching process is applied to the film 8 in neither the TD direction nor the MD direction.

As described above, in the region 20A, the pitch P between the link mechanisms 11 on the film side of the link apparatus 10R is kept constant, and the pitch P between the link mechanisms 11 on the film side of the link apparatus 10L is also kept constant. Subsequently, in the region 20B, the pitch P between the link mechanisms 11 on the film side of the link apparatus 10R and the pitch P between the link mechanisms 11 on the film side of the link apparatus 10L are gradually increased. Then, in the region 20C, the pitch P between the link mechanisms 11 on the film side of the link apparatus 10R is kept constant, and the pitch P between the link mechanisms 11 on the film side of the link apparatus 10L is also kept constant.

Accordingly, on the film side of each of the link apparatus 10R and the link apparatus 10L, the pitch P between the link mechanisms 11 in the region 20C is larger than the pitch P between the link mechanisms 11 in the region 20A. From another point of view, on the film side of each of the link apparatus 10R and the link apparatus 10L, the pitch between the film holders 21 in the region 20C is larger than the pitch between the film holders 21 in the region 20A. From still another point of view, on the film side of each of the link apparatus 10R and the link apparatus 10L, the distance L1 between the rail 13 and the rail 14 in the region 20C is smaller than the distance L1 between the rail 13 and the rail 14 in the region 20A. In this manner, the stretching operation of the stretch apparatus 5 is performed.

Study on Improvement

For example, in the region 20A, the region 20B, and the region 20C shown in FIG. 3, the film 8 is held by the film holder 21 included in each link mechanism 11.

Figure 4:
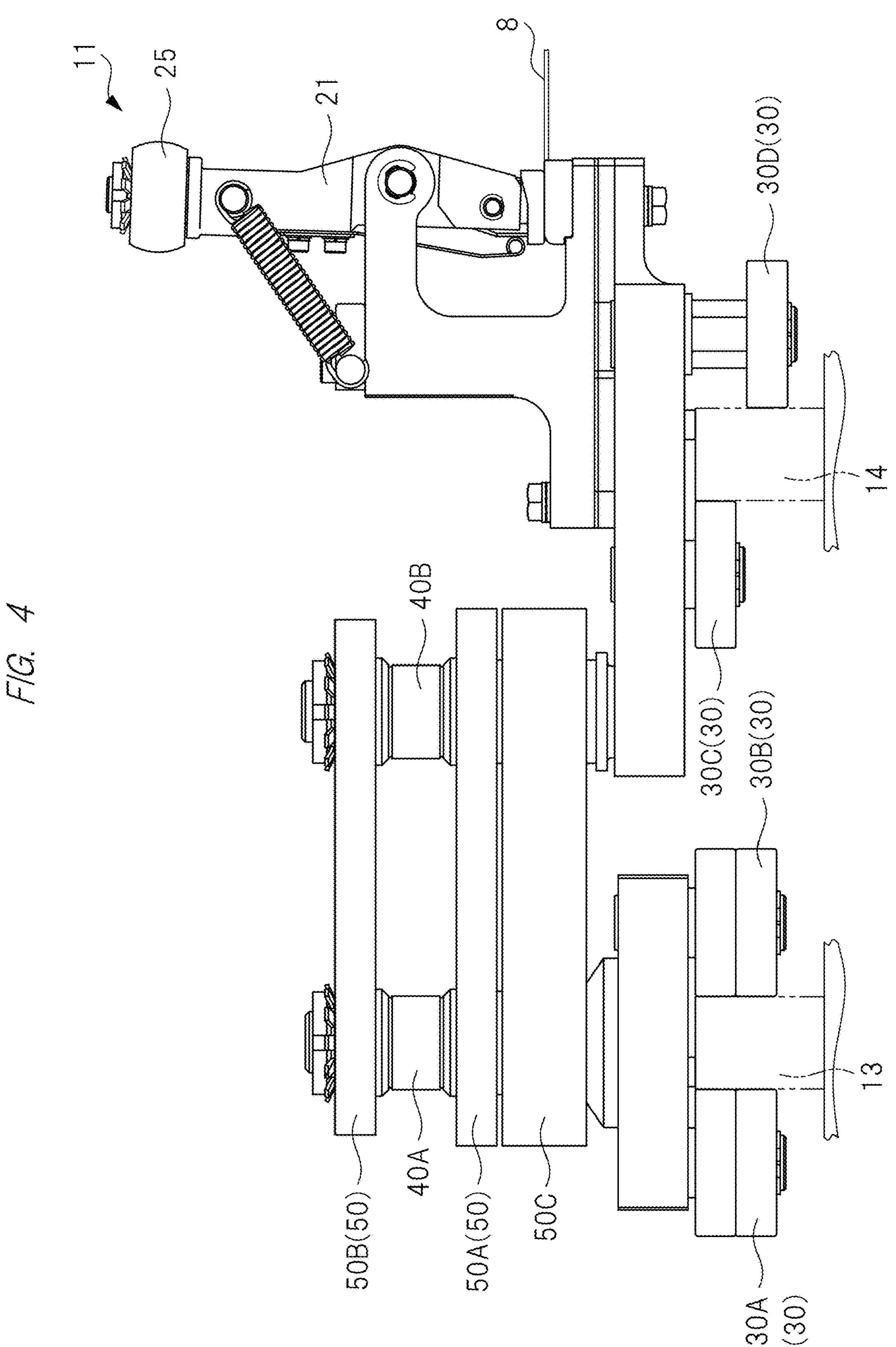
FIG. 4 is a diagram schematically showing a link mechanism that is holding a film.

FIG. 4 is a diagram schematically showing the link mechanism holding the film.

In FIG. 4, the link mechanism 11 includes the film holder 21 holding the film 8, and the film holder 21 is provided with a guide plate receiving roller 25. In addition, the link mechanism 11 is placed on the pair of rails 13 and 14 on which the link mechanism 11 runs, and includes a running guide roller 30A and a running guide roller 30B which are rotatable and contact with the rail 13, and a running guide roller 30C and a running guide roller 30D which are rotatable and contact with the rail 14. And, the link mechanism 11 includes a link shaft 40B linked to the film holder 21 and a link shaft 40A linked to the link shaft 40B. In particular, the link shaft 40A and the link shaft 40B are linked by a lower link plate 50C and an upper link plate 50 (50A, 50B).

The link mechanism 11 thus configured as described above performs, for example, the operation of holding the film 8 at the transport-in port (inlet) for the film 8 on the left side of the region 20A shown in FIG. 3, and also performs the operation of removing the held film 8 from the link mechanism 11 at the transport-out port (outlet) for the film 8 on the right side of the region 20C shown in FIG. 3.

Figure 5:
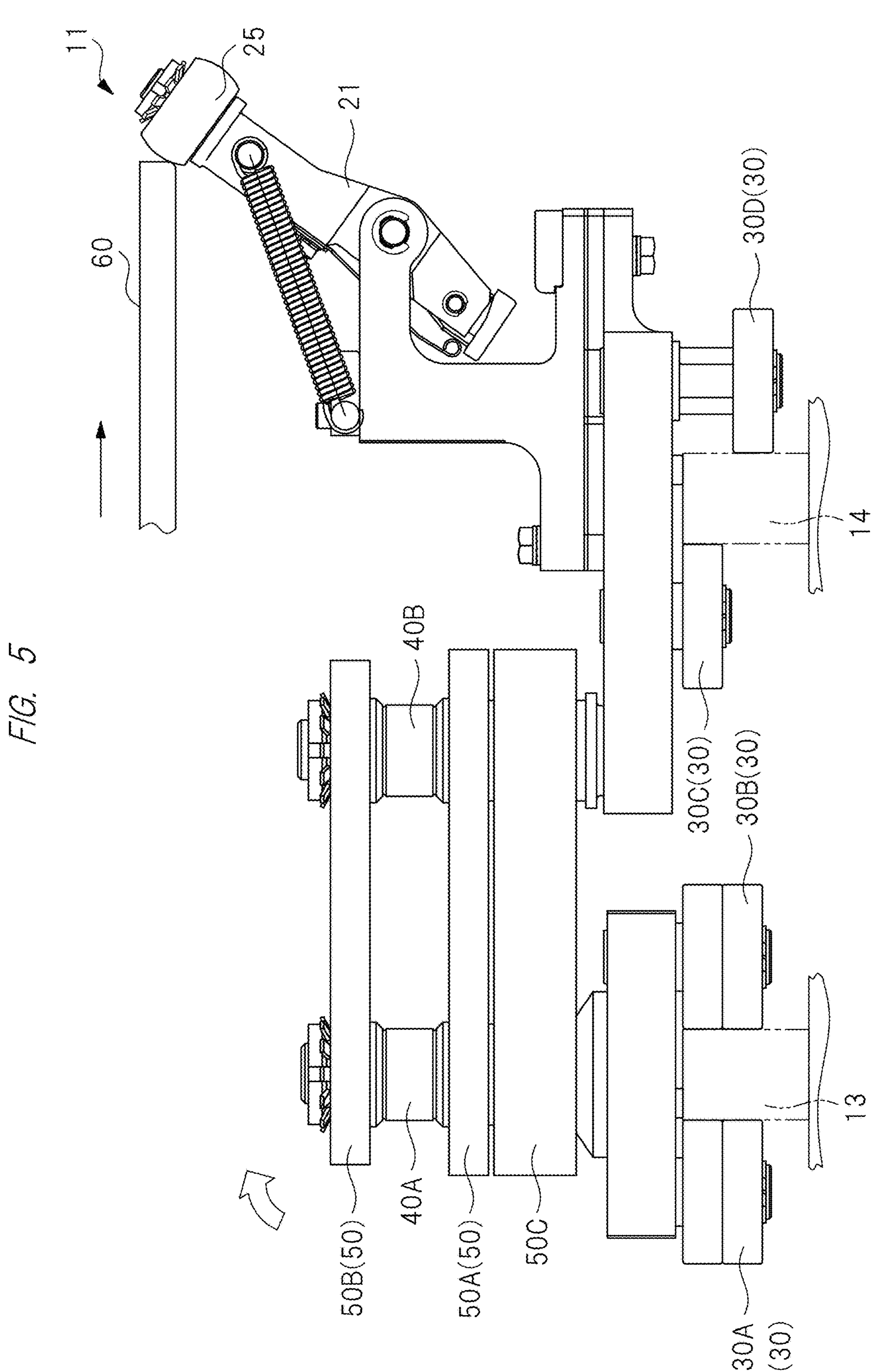
FIG. 5 is a diagram showing an operation of releasing a film holder performed during an operation of holding a film in a link mechanism or an operation of removing the film from the link mechanism.

FIG. 5 is a diagram showing the operation of releasing the film holder performed during the operation of holding the film in the link mechanism and the operation of removing the film from the link mechanism.

As shown in FIG. 5, in the link mechanism 11, the film holder 21 is released by, for example, bringing a guide plate 60 to be pressed against the guide plate receiving roller 25 provided in the film holder 21. Then, when the film is held in the link mechanism 11, the film is held by the film holder 21 because of the operation of inserting the film into the released film holder 21. On the other hand, when the film is removed from the link mechanism 11, the insertion of the film into the film holder 21 is canceled by releasing the film holder 21 to remove the film from the film holder 21.

Here, as shown in FIG. 5, by pressing the guide plate 60 against the guide plate receiving roller 25 provided in the film holder 21, the film holder 21 is released. However, because the pressing force of the guide plate 60 is applied to a position distant from the center line of the link mechanism 11, a moment due to the pressing force of the guide plate 60 occurs in the link mechanism 11. As a result, as shown in FIG. 5, due to the moment, a portion (close to the link shaft 40A side) of the link mechanism 11 on the side opposite to the film holder 21 across the center line is lifted.

Such lifting of the link mechanism 11 causes a risk of derailment of the link mechanism 11 from the pair of rails 13 and 14. Therefore, in order to prevent the derailment of the link mechanism 11 beforehand, it is desirable to take measures to suppress the lifting of the link mechanism 11.

DESCRIPTION OF RELATED ART

Thus, the following related art is exemplified as a technique of suppressing the lifting of the link mechanism 11 caused when the film holder 21 is released by the guide plate 60.

The term "related art" described herein means a technique that is not a publicly-known art but has a problem found by the present inventors, and is a technique that is the premise of the present invention.

Figure 6:
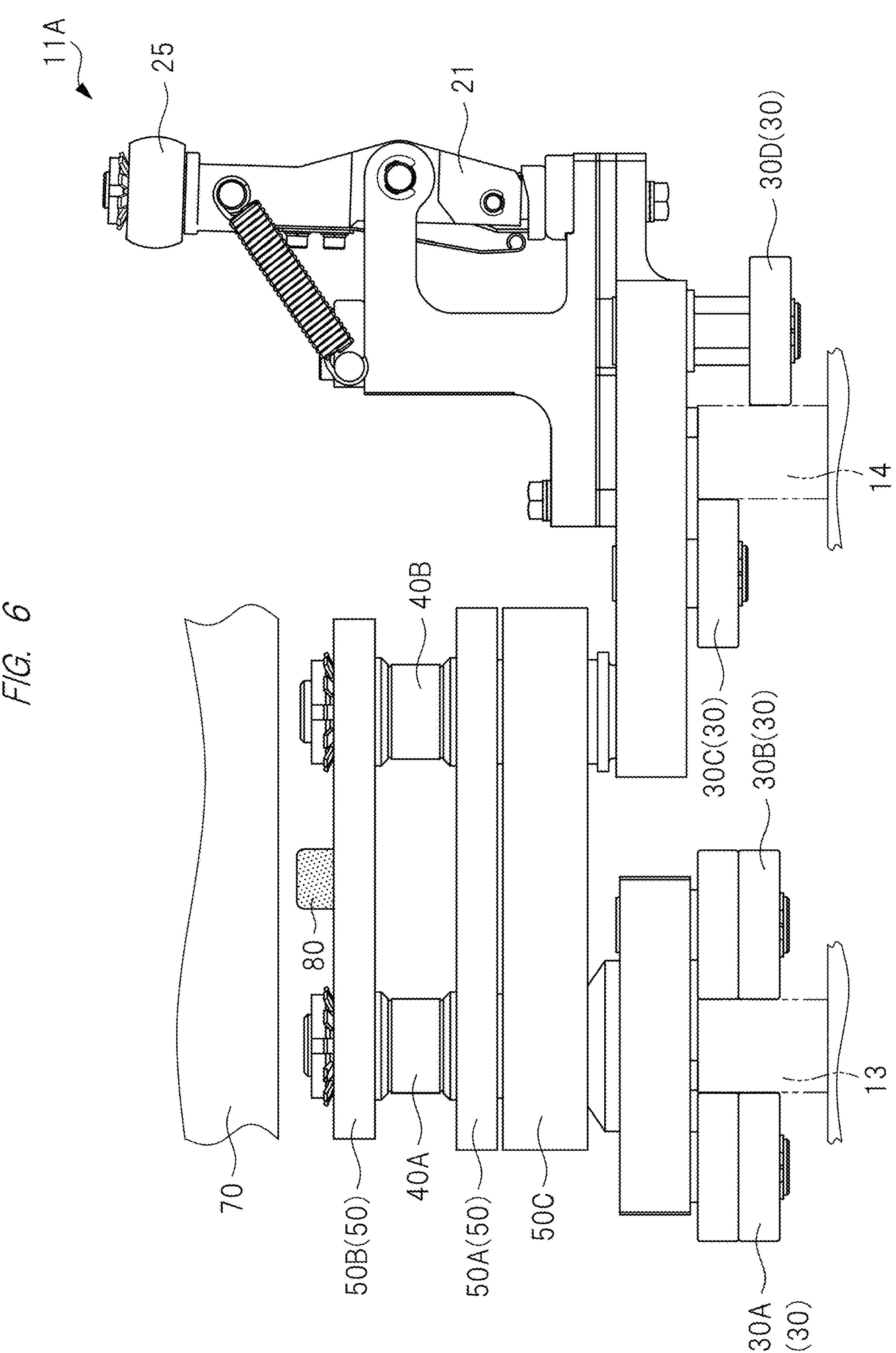
FIG. 6 is a diagram for explaining a configuration of a related-art link mechanism.

FIG. 6 is a diagram for explaining a configuration of a link mechanism of the related art.

In FIG. 6, a link retainer 70 is placed above an upper link plate 50 of a link mechanism 11A. The link retainer 70 is placed, for example, from a transport-in port for the film 8 on the left side of the region 20A to a transport-out port for the film 8 on the right side of the region 20C through the region 20A, the region 20B, and the region 20C shown in FIG. 3. Then, as shown in FIG. 6, the link mechanism 11A is provided with a sliding part 80 fixed to the upper link plate 50. Accordingly, in the link mechanism 11A, even if the moment occurs due to the pushing force by the guide plate, the sliding part 80 contacts with the link retainer 70 due to the moment. As a result, the lifting of the link mechanism 11 caused when the film holder 21 is released by the guide plate can be suppressed.

In particular, since the sliding part 80 contacts with the link retainer 70 at the transport-in port for the film 8 on the left side of the region 20A and the transport-out port for the film 8 on the right side of the region 20C, the lifting of the link mechanism 11 due to the moment caused when the film holder 21 is released is suppressed. Meanwhile, since the sliding part 80 contacts with the link retainer 70 in the region 20A, the region 20B and the region 20C, the derailment of the link mechanism 11A running on the pair of rails 13 and rail 14 is suppressed. During normal running of the link mechanism 11A, note that a slight gap exists between the sliding part 80 and the link retainer 70 in order to reduce the running resistance.

According to the related art configured as described above, although the lifting of the link mechanism 11A can be suppressed, there is room for the following improvement. That is, in the related art, the sliding part 80 is provided to suppress the lifting of the link mechanism 11A. Such a sliding part 80 is generally made of materials such as brass and carbon. However, these materials may be substances prohibited from use in the link apparatuses. Further, the sliding part 80 contacts with the link retainer 70 during the running of the link mechanism 11A, and the related art has a high risk of occurrence of wear debris since the contact mode between the sliding part and the link retainer is "sliding". That is, in the related art, there is room for improvement from the viewpoint of improving the performance of the link apparatus including the link mechanism 11A. Thus, in the first embodiment, a devisal for the room for improvement in the related art has been made. In this respect, findings newly discovered by the present inventors as a measure for the room for improvement in the related art will be described first.

Findings Newly Discovered by the Present Inventors

Figure 7:
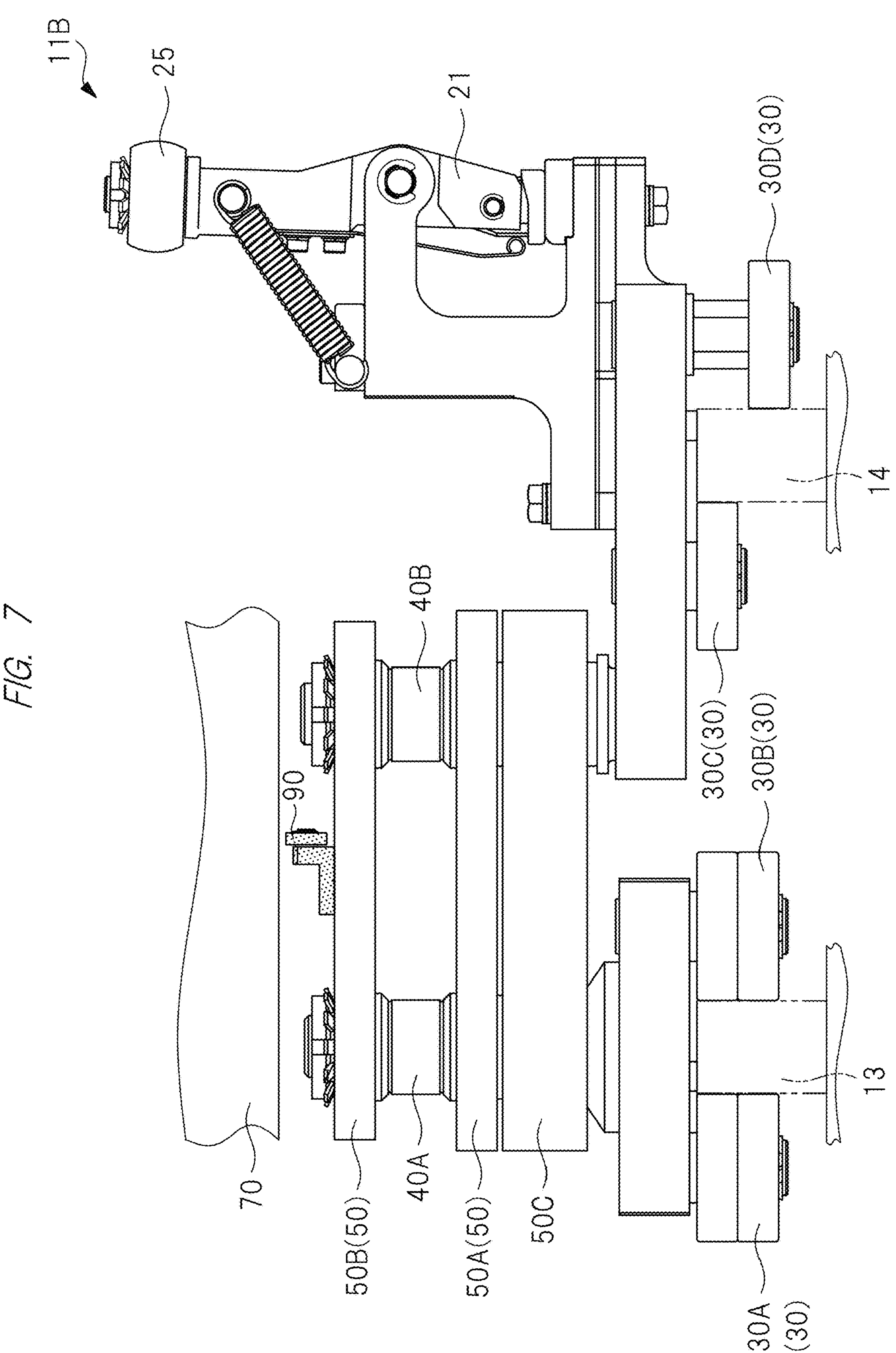
FIG. 7 is a diagram for explaining findings newly found by the present inventors.

FIG. 7 is a diagram for explaining the findings newly discovered by the present inventors.

In FIG. 7, according to the findings newly discovered by the present inventors, instead of the "sliding part 80" in the related art, a rotatable roller 90 is provided on the upper link plate 50. According to such findings, lifting of a link mechanism 11B is suppressed by contact between the roller 90 and the link retainer 70. Here, the roller 90 may be made of, for example, bearing steel which is not the substance prohibited from use. In addition, when the roller 90 contacts with the link retainer 70 during the running of the link mechanism 11B, the risk of the occurrence of wear debris can be reduced more than that of the related art that uses the "sliding part 80" since the contact mode between the roller 90 and the link retainer 70 is "rolling (contact mode between the rotating roller 90 and the link retainer 70)". That is, according to such findings, presumably, the performance of the link apparatus including the link mechanism 11B can be improved.

However, according to the study by the present inventors, it has been revealed that the case of the use of the roller 90 as the part that contacts with the link retainer 70 has matters to be overcome. Thus, the matters to be overcome will be described.

Matters to Be Overcome

Figure 8:
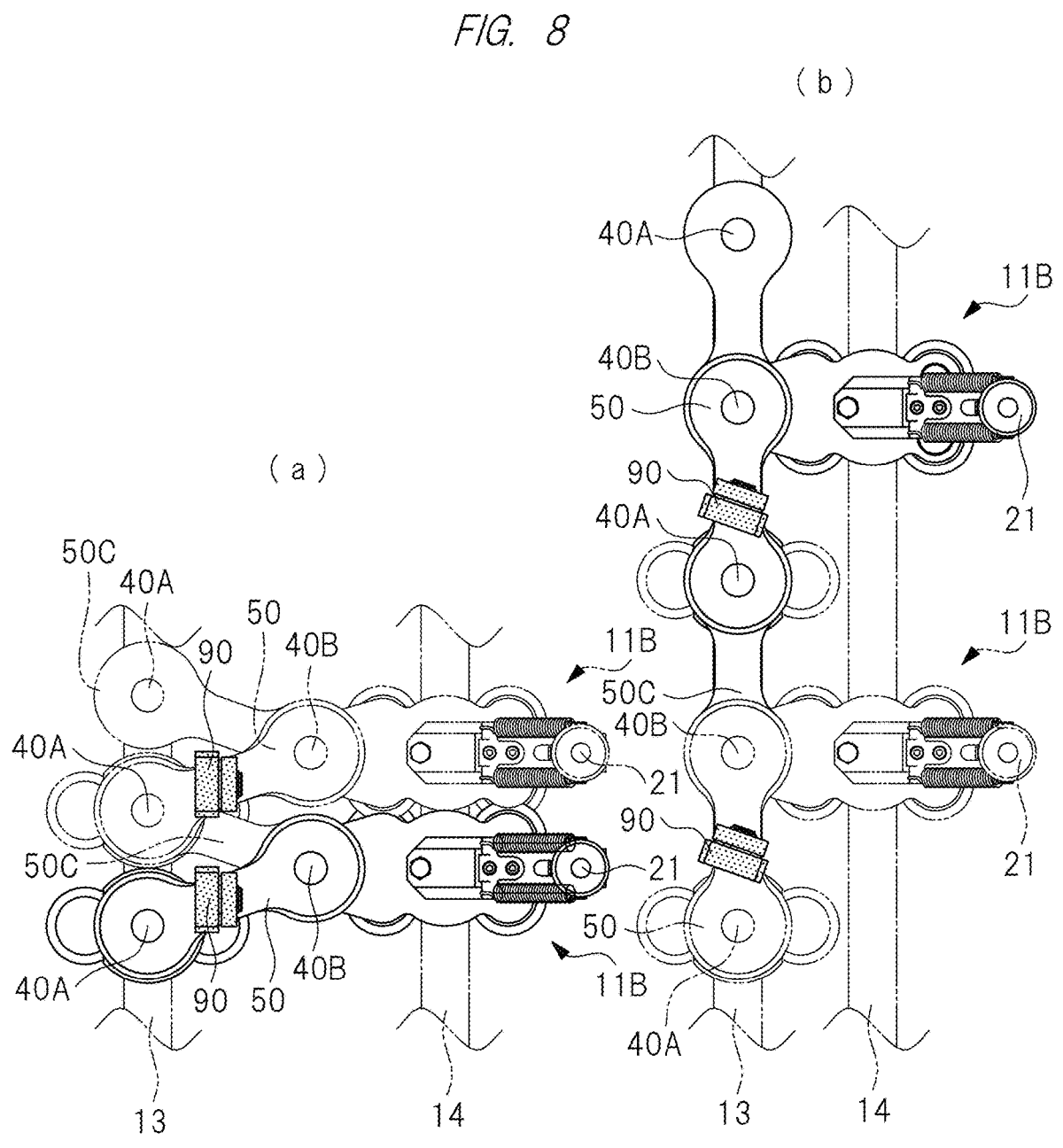

FIG. 8(*a*) is a diagram showing a closed state of the link mechanism.

In FIG. 8(*a*), the "closed state" of the link mechanism 11B is a state in which the lower link plate 50C and the upper link plate 50 are folded, and is defined as a state in which an angle made between the lower link plate 50C and the upper link plate 50 is an acute angle close to 0°. In other words, the "closed state" of the link mechanism 11B is a state in which alignment directions of the link shaft 40A and the link shaft 40B intersect extension directions of the rail 13 and the rail 14.

In this "closed state" of the link mechanism 11B, the pitch between the film holders 21 of the link mechanisms 11B adjacent to each other is the smallest.

And, in the "closed state" of the link mechanism 11B described above, as shown in FIG. 8(*a*), the rotation axis of the roller 90 is orthogonal to the extension directions of the rail 13 and the rail 14.

As a result, even when the roller 90 and the link retainer (not shown) contact with each other during the running of the link mechanism 11B on the rail 13 and the rail 14, the risk of the occurrence of wear debris can be reduced since the contact mode between the roller 90 and the link retainer is "rolling".

Next, FIG. 8(*b*) is a diagram showing an open state of the link mechanism.

In FIG. 8(*b*), the "open state" of the link mechanism 11B is a state in which the lower link plate 50C and the upper link plate 50 are open, and is defined as a state in which the angle made between the lower link plate 50C and the upper link plate 50 is close to 180°. In other words, the "open state" of the link mechanism 11B is a state in which the alignment directions of the link shaft 40A and the link shaft 40B are parallel to the extension directions of the rail 13 and the rail 14.

In this "open state" of the link mechanism 11B, the pitch between the film holders 21 of the link mechanisms 11B adjacent to each other is the largest.

However, in the "open state" of the link mechanism 11B described above, as shown in FIG. 8(*b*), the rotation axis of the roller 90 is not orthogonal to the extension directions of the rail 13 and the rail 14. That is, when the roller 90 is fixed to the upper link plate 50 so that the rotation axis of the roller 90 in the "closed state" of the link mechanism 11B is orthogonal to the extension directions of the rail 13 and the rail 14 as shown in FIG. 8(*a*), the rotation axis of the roller 90 is not orthogonal to the extension directions of the rail 13 and the rail 14 due to the change in the angle made between the upper link plate 50 and the lower link plate 50C in the "open state" of the link mechanism 11B.

Accordingly, in the "open state" of the link mechanism 11B, when the roller 90 and the link retainer (not shown) contact with each other during the running of the link mechanism 11B on the rail 13 and the rail 14, the risk of the occurrence of wear debris cannot be reduced since the contact mode between the roller 90 and the link retainer is not "rolling" but "sliding".

Therefore, in the configuration where the rotatable roller 90 is provided on the upper link plate 50, the rotation axis of the roller 90 is not orthogonal to the extension directions of the rail 13 and the rail 14 in both the "closed state" and the "open state" of the link mechanism 11B, and therefore, the contact mode between the roller 90 and the link retainer cannot be set to "rolling" in both the "closed state" and the "open state" of the link mechanism 11B.

Thus, as a result of diligent studies, the present inventors have designed a technical idea of not fixing the rotatable roller 90 to the upper link plate 50, but a devisal for the method of fixing the roller, capable of setting "rolling" to the contact mode between the roller and the link retainer in both the "closed state" and the "open state" of the link mechanism. Hereinafter, the technical idea with this devisal in the first embodiment will be described.

Configuration of Link Mechanism in First Embodiment

Figure 9:
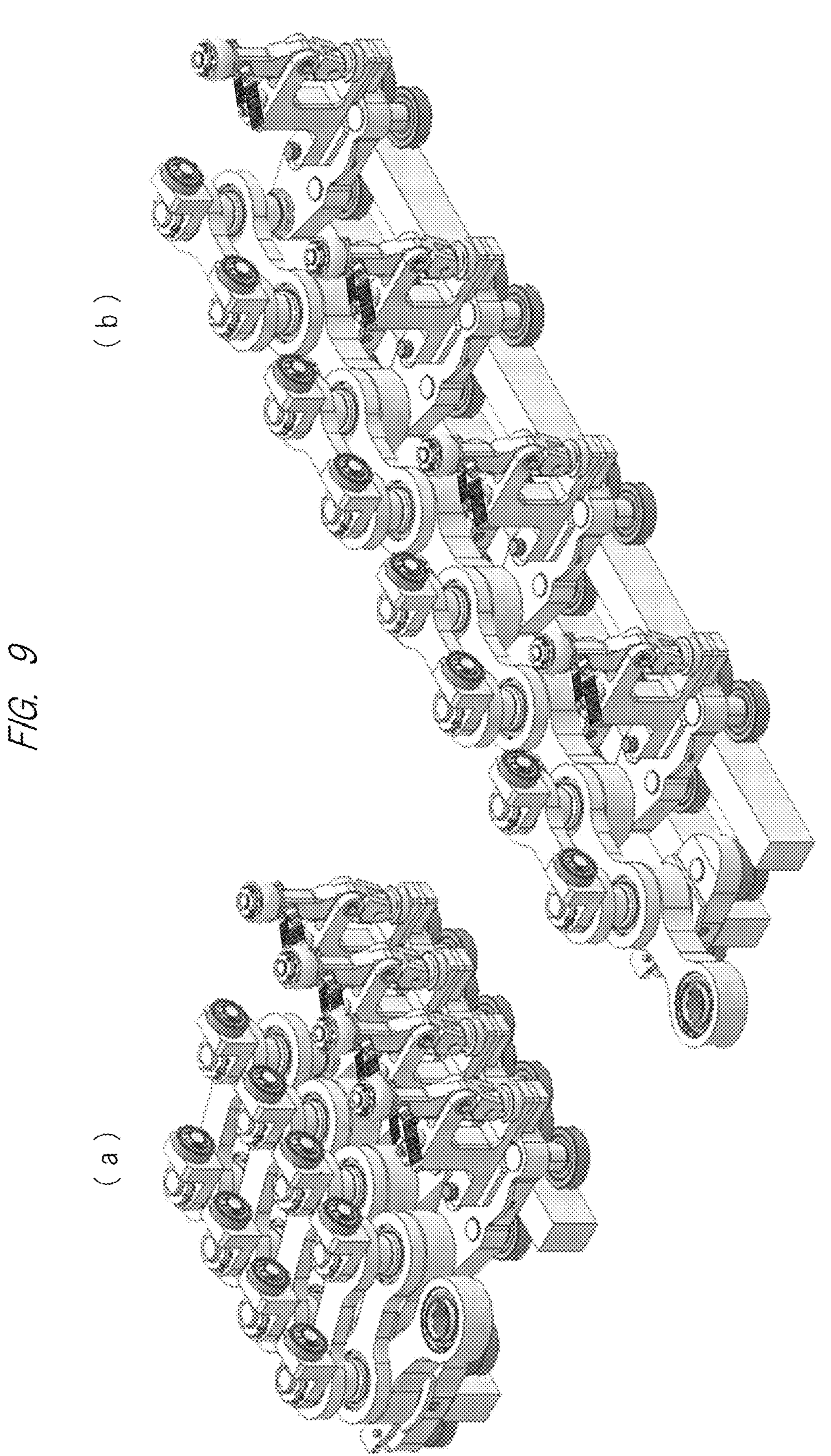
FIG. 9(*a*) is a perspective view showing a "closed state" of a link mechanism in the first embodiment, and FIG. 9(*b*) is a perspective view showing an "open state" of the link mechanism in the first embodiment.

FIG. 9 is a perspective view schematically showing the configuration of the link mechanism in the first embodiment. In particular, FIG. 9(*a*) is a perspective view showing the "closed state" of the link mechanism in the first embodiment, and FIG. 9(*b*) is a perspective view showing the "open state" of the link mechanism in the first embodiment.

Figure 10:
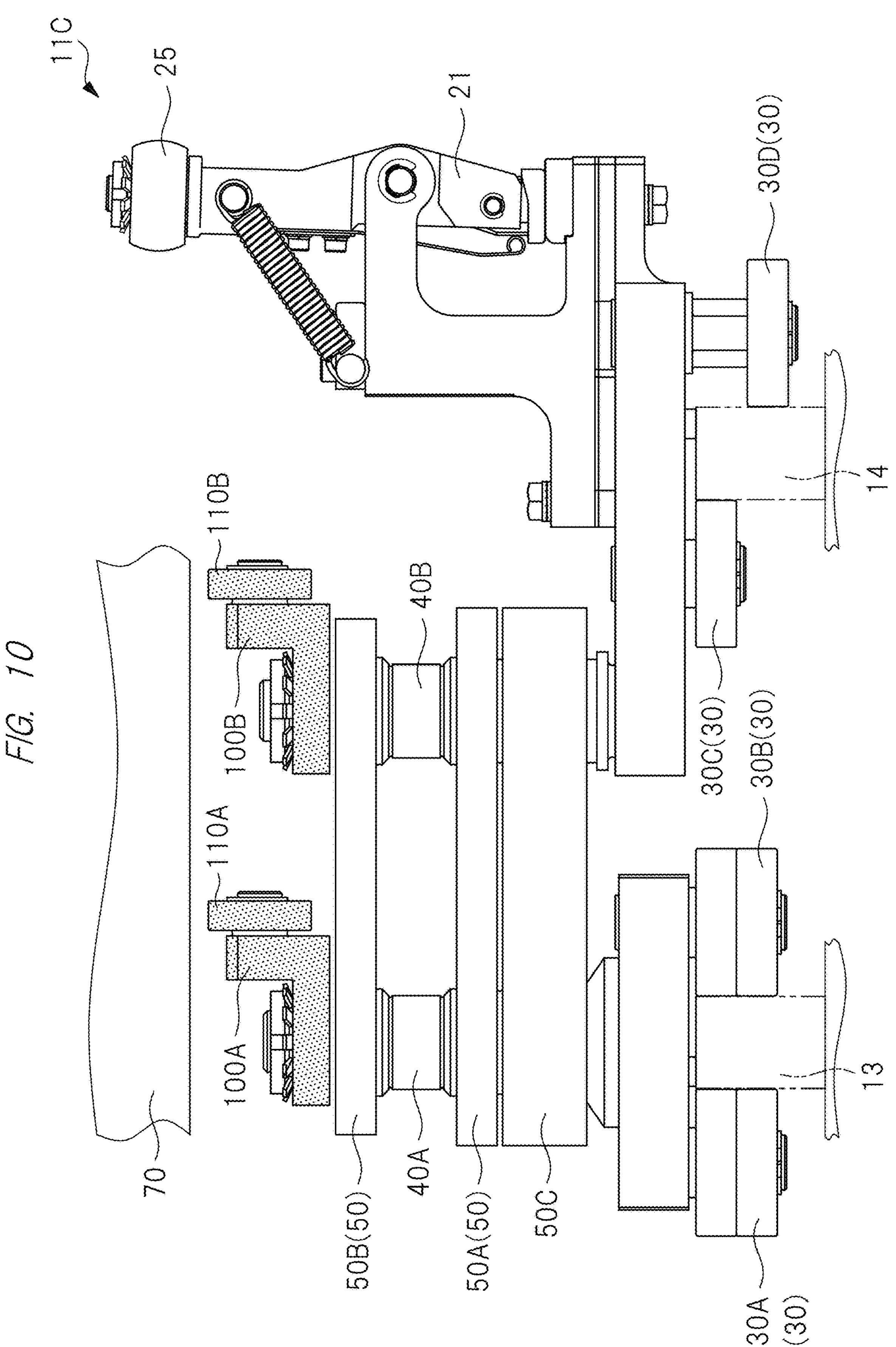
FIG. 10 is a diagram for explaining a link mechanism in the first embodiment.

FIG. 10 is a diagram for explaining the link mechanism in the first embodiment.

In FIG. 10, a link mechanism 11C includes the film holder 21 holding the film, and the film holder 21 is provided with the guide plate receiving roller 25. In addition, the link mechanism 11C is placed on the pair of rails 13 and rail 14 on which the link mechanism 11C runs, and includes a running guide roller 30A and a running guide roller 30B which are rotatable and contact with the rail 13, and a running guide roller 30C and a running guide roller 30D which are rotatable and contact with the rail 14. And, the link mechanism 11 includes a link shaft 40B linked to the film holder 21 and a link shaft 40A linked to the link shaft 40B. In particular, the link shaft 40A and the link shaft 40B are linked by a lower link plate 50C and an upper link plate 50.

And, on the upper link plate 50, an "L-shaped" bracket 100A fixed to the link shaft 40A is placed, and a roller 110A contactable with the link retainer 70 is attached to the bracket 100A.

Similarly, on the upper link plate 50, an "L-shaped" bracket 100B fixed to the link shaft 40B is placed, and a roller 110B contactable with the link retainer 70 is attached to the bracket 100B.

The link mechanism 11C in the first embodiment is configured as described above.

Features of First Embodiment

Next, features of the first embodiment will be described.

As the features of the first embodiment, for example, as shown in FIG. 10, the link mechanism 11C includes the roller 110A attached to the bracket 100A fixed to the link shaft 40A, and also includes the roller 110B attached to the bracket 100B fixed to the link shaft 40B. That is, as the features of the first embodiment, for example, as shown in FIG. 7, the upper link plate 50 is not provided with the roller 90 contactable with the link retainer 70, but the brackets (100A, 100B) fixed to the link shafts (40A, 40B) are provided with the rollers (110A, 110B) contactable with the link retainer 70. Accordingly, according to the first embodiment, the rotation axes of the roller 110A and the roller 110B can be configured to be orthogonal to the extension directions of the rail 13 and the rail 14 in both the "closed state" and the "open state" of the link mechanism 11C.

As a result, the contact mode between the rollers 110A, 110B and the link retainer 70 can be set to "rolling" in both the "closed state" and the "open state" of the link mechanism 11C. Therefore, according to this embodiment, the occurrence of wear debris can be reduced.

The following is explanation about the configuration of the link mechanism 11C allowing the rotation axes of the roller 110A and the roller 110B to be orthogonal to the extension directions of the rail 13 and the rail 14 in both the "closed state" and the "open state" of the link mechanism 11C.

Figure 11:
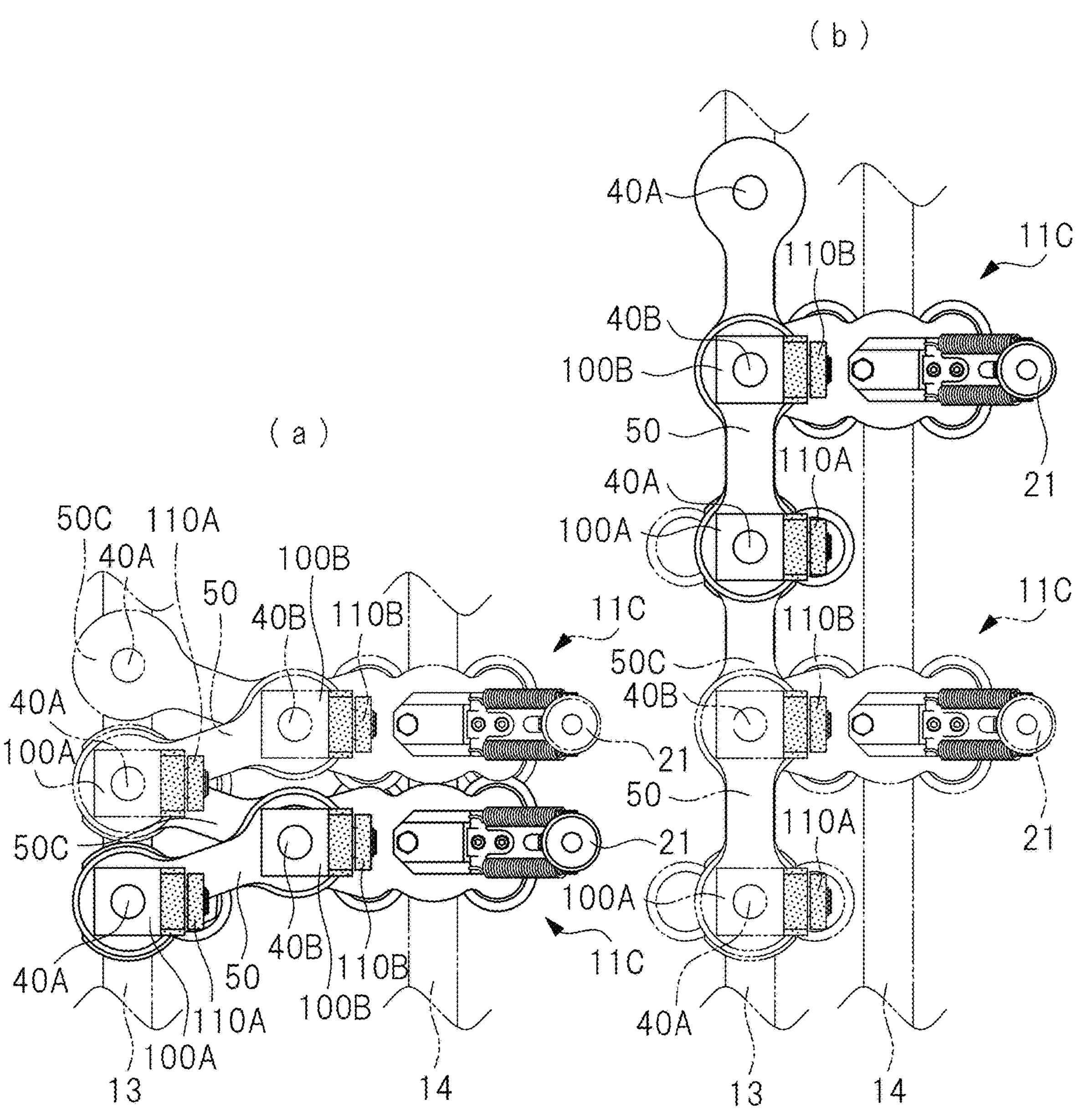
FIG. 11(*a*) is a diagram showing a closed state of a link mechanism, and FIG. 11(*b*) shows an open state of the link mechanism.

FIG. 11(*a*) is a diagram showing the closed state of the link mechanism.

In FIG. 11(*a*), the "closed state" of the link mechanism 11C is a state in which the lower link plate 50C and the upper link plate 50 are folded, and is defined as a state in which an angle made between the lower link plate 50C and the upper link plate 50 is an acute angle close to 0°. In other words, the "closed state" of the link mechanism 11C is a state in which the alignment directions of the link shaft 40A and the link shaft 40B which are adjacent to each other intersect the extension directions of the rail 13 and the rail 14. Further, in the "closed state" of the link mechanism 11C, the link shaft 40A is placed above the rail 13 while the link shaft 40B is placed at a position that shifts from above both the rail 13 and the rail 14 as shown in FIG. 11(*a*).

In the "closed state" of the link mechanism 11C configured as described above, the pitch between the film holders 21 of the link mechanisms 11C adjacent to each other is the smallest.

And, in the "closed state" of the link mechanism 11C described above, the rotation axes of the roller 110A and the roller 110B are orthogonal to the extension directions of the rail 13 and the rail 14 (extension direction of the pair of rails) as shown in FIG. 11(*a*).

As a result, even when the rollers (110A, 110B) and the link retainer (not shown) contact with each other during the running of the link mechanism 11C on the rail 13 and the rail 14, the risk of the occurrence of wear debris can be reduced since the contact mode between the rollers (110A, 110B) and the link retainer is "rolling".

Next, FIG. 11(*b*) is a diagram showing the open state of the link mechanism.

In FIG. 11(*b*), the "open state" of the link mechanism 11C is a state in which the lower link plate 50C and the upper link plate 50 are open, and is defined as a state in which the angle made between the lower link plate 50C and the upper link plate 50 is close to 180°. In other words, the "open state" of the link mechanism 11C is a state in which the alignment directions of the link shaft 40A and the link shaft 40B adjacent to each other are parallel to the extension directions of the rail 13 and the rail 14. Further, in the "closed state" of the link mechanism 11C, each of the link shaft 40A and the link shaft 40B is placed above the rail 13 as shown in FIG. 11(*b*).

In the "open state" of the link mechanism 11C configured as described above, the pitch between the film holders 21 of the link mechanisms 11C adjacent to each other is the largest.

Then, even in the "open state" of the link mechanism 11C described above, the rotation axes of the roller 110A and the roller 110B are orthogonal to the extension directions of the rail 13 and the rail 14 (extension direction of the pair of rails) as shown in FIG. 11(*b*). This is because in the link mechanism 11C in the first embodiment, the roller 110A and the roller 110B are not fixed to the upper link plate 50, but the roller 110A is fixed to the link shaft 40A via the bracket 100A while the roller 110B is fixed to the link shaft 40B via the bracket 100B.

For example, if the roller 110A and the roller 110B are fixed to the upper link plate 50, the rotation axes of the roller 110A and the roller 110B in the "open state" of the link mechanism 11C are not orthogonal to the extension directions of the rail 13 and the rail 14 due to the change in the angle made between the upper link plate 50 and the lower link plate 50C.

On the other hand, in the first embodiment, the roller 110A and the roller 110B are not fixed to the upper link plate 50, but the roller 110A contactable with the link retainer 70 is fixed to the bracket 100A fixed to the link shaft 40A while the roller 110B contactable with the link retainer 70 is fixed to the bracket 100B fixed to the link shaft 40B. For this reason, the configuration according to the link mechanism 11C allows the rotation axes of the roller 110A and the roller 110B to be orthogonal to the extension directions of the rail 13 and the rail 14 in not only the "closed state" but also the "open state" of the link mechanism 11C without being affected by the change in the angle made between the upper link plate 50 and the lower link plate 50C. Therefore, according to the features of the first embodiment, the contact mode between the rollers 110A, 110B and the link retainer 70 can be set to "rolling" in both the "closed state" and the "open state" of the link mechanism 11C. For this reason, according to the first embodiment, the occurrence of wear debris can be reduced.

Advantages of Link Mechanism 11C

The link mechanism 11C has the following advantages.

That is, for example, as shown in FIG. 11(*a*) and FIG. 11(*b*), the angle made between the film holder 21 included in the link mechanism 11C and each of the rail 13 and the rail 14 is a right angle in both the "closed state" and the "open state" of the link mechanism 11C. For this reason, according to the link mechanism 11C, "twist" on the film held by the link mechanism 11C is suppressed. That is, since the film is not "twisted" in both the "closed state" and the "open state" of the link mechanism 11C, the link mechanism 11C can provide an advantage in that the film can be prevented from splitting due to the "twist".

Therefore, the link mechanism 11C can effectively prevent the film from splitting due to the "twist", and thus is effectively applied to the stretching of acrylic films and nylon films which tend to split.

Film Manufacturing Method

Next, a method of manufacturing a film by using a stretch apparatus having the link mechanism 11C will be described. Specifically, for example, as shown in FIG. 10, the link mechanism 11C is configured to be movable on the pair of rails (rail 13 and rail 14), and includes the film holder 21 holding the film, the link shafts (40A, 40B) linked to the film holder 21, the brackets (100A, 100B) fixed to the link shafts (40A, 40B), and the rollers (110A, 110B) attached to the brackets (100A, 100B) and contactable with the link retainer 70. And, the film is stretched while being held by a stretch apparatus having the link mechanism 11C configured as described above.

Figure 12:
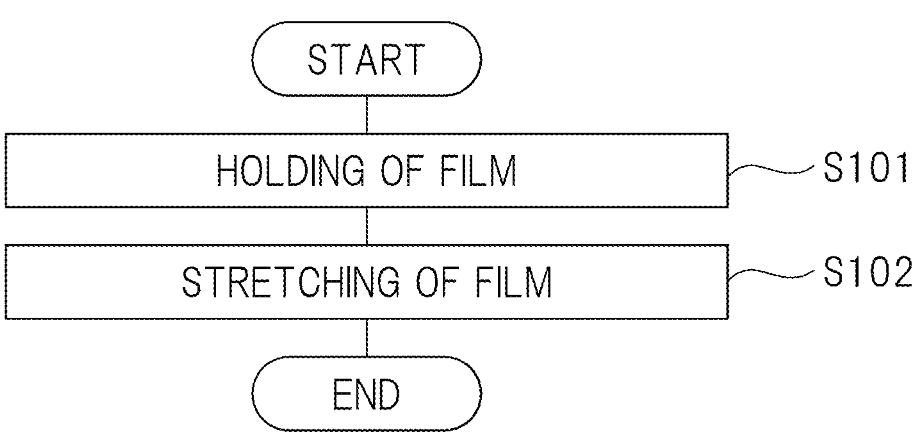
FIG. 12 is a flow chart showing a film manufacturing process.

FIG. 12 is a flow chart showing a film manufacturing process.

In FIG. 12, first, the film is held by the film holder 21 included in the link mechanism 11C (S101), and then, the link mechanism 11C holding the film is run in the region 20A, the region 20B, and the region 20C shown in FIG. 3 along the pair of rails (rail 13 and rail 14), and therefore, the film is stretched (S102).

Figure 13:
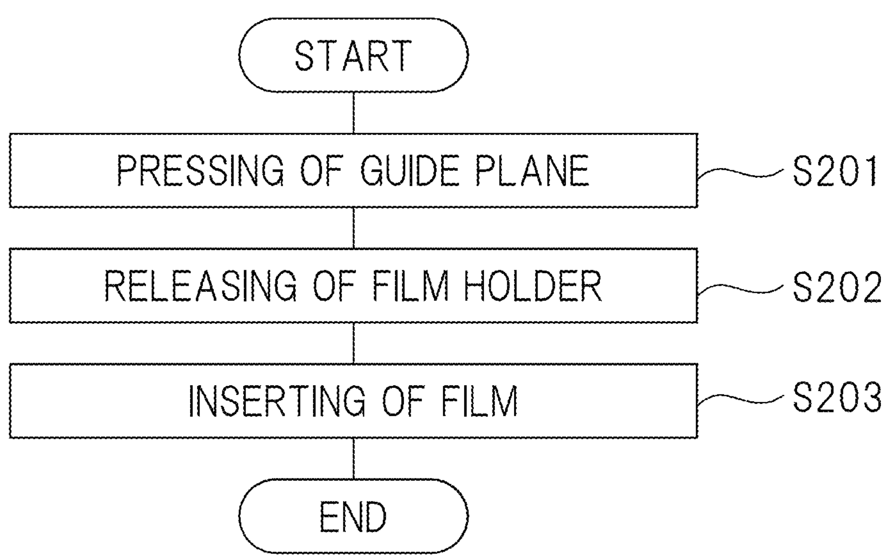
FIG. 13 is a flow chart showing an example of a step of holding a film.

Here, FIG. 13 is a flow chart showing an example of the step of holding the film.

In FIG. 13, first, the guide plate 60 is pressed against the guide plate receiving roller 25 of the film holder 21 included in the link mechanism 11C (see FIG. 5) (S201). Accordingly, for example, as shown in FIG. 5, the film holder 21 is released (S202). In this state, the film is inserted into the released film holder 21 (S203). As a result, the film can be held by the film holder 21 of the link mechanism 11C.

As this time, due to the pressing of the guide plate 60 against the film holder 21 (S201 and S202), the moment occurs in the link mechanism 11C. For this reason, a lifting force is applied to the link mechanism 11C. However, the link mechanism 11C in this embodiment is provided with the rollers (110A, 110B) fixed to the link shafts (40A, 40B) via the brackets (100A, 100B), and thus the lifting of the link mechanism 11C due to the moment is suppressed when the roller 110A and the roller 110B contact with the link retainer 70. And, even when the link mechanism 11C runs on the pair of rails over the region 20A, the region 20B, and the region 20C shown in FIG. 3, the rotation axes of the roller 110A and the roller 110B are maintained to be orthogonal to the extension directions of the rail 13 and the rail 14. Therefore, even when the roller 110A and the roller 110B contact with the link retainer 70 during the running of the link mechanism 11C, the contact mode between the rollers 110A, 110B and the link retainer 70 can be set to “rolling” in both the “closed state” and the “open state”. For this reason, according to the method of manufacturing the film in this embodiment, the occurrence of wear debris can be reduced.

In this manner, as a result of adopting the link mechanism 11C having the features of this embodiment, the performance of the link apparatus, and eventually of the stretch apparatus can be improved, and quality of the film manufactured by this stretch apparatus can be improved.

Second Embodiment

In a second embodiment, an example of adoption of the technical idea of the first embodiment described above to a link mechanism having a different structure from that of the link mechanism 11C described in the first embodiment will be described.

Room for Improvement

Figure 14:
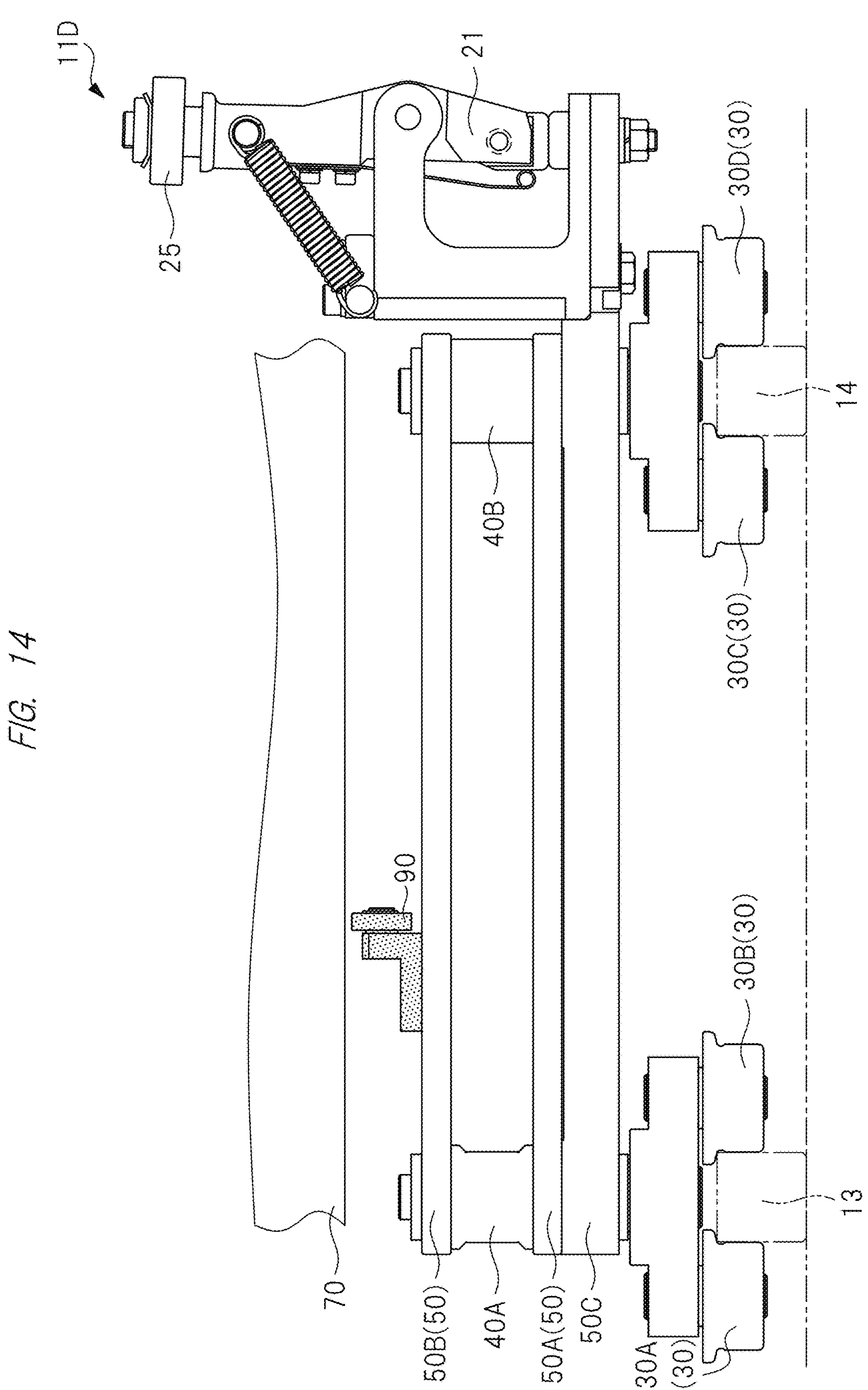
FIG. 14 is a diagram showing an example of a configuration of a link mechanism.

FIG. 14 is a diagram showing an example of a configuration of the link mechanism.

A link mechanism 11D in FIG. 14 is different from the link mechanism 11B shown in FIG. 7 in that, for example, the link shaft 40A is placed on the rail 13 while the link shaft 40B is placed on the rail 14. That is, in the link mechanism 11D, the link shaft 40A is placed on the rail 13 while the link shaft 40B is placed on the rail 14 in both the “closed state” and the “open state” of the link mechanism 11D. In this respect, the link mechanism 11D is different from the link mechanism 11B in which the link shaft 40B is placed at the position, for example, shifting from above the rail 13 and the rail 14 as shown in FIG. 7.

Here, even in the link mechanism 11D shown in FIG. 14, it is considered to fix the rotatable roller 90 to the upper link plate 50 as similar to the link mechanism 11B shown in FIG. 7. Also in this case, since the contact mode between the roller 90 and the link retainer 70 is “rolling”, the risk of the occurrence of wear debris can be made smaller than that of the related art that uses the “sliding part 80”.

However, the link mechanism 11D also has room for improvement as described in the section “Matters to Be Overcome”, and thus, this point will be described below.

Figure 15:
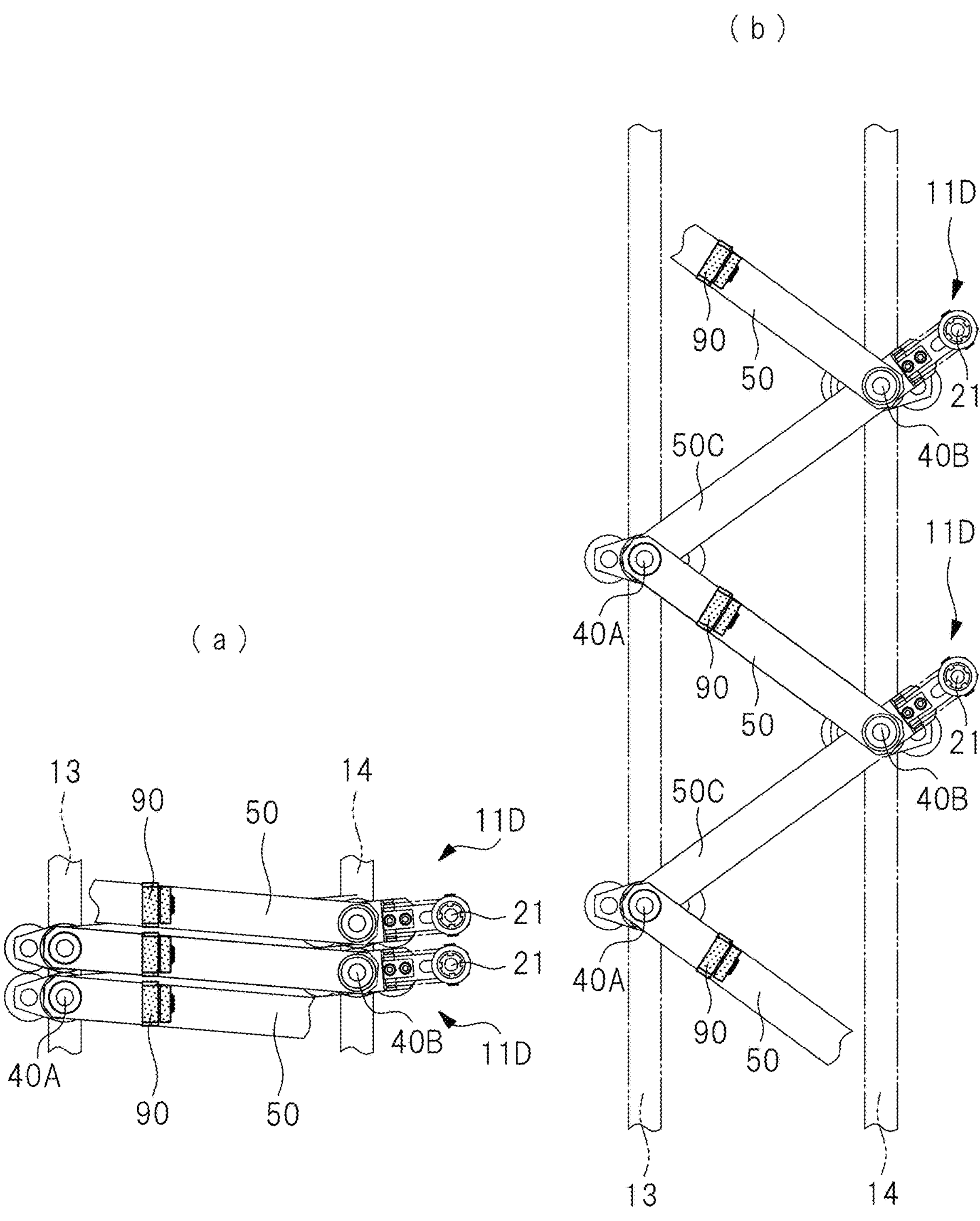
FIG. 15(*a*) is a diagram showing a closed state of a link mechanism, and FIG. 15(*b*) is a diagram showing an open state of the link mechanism.

FIG. 15(*a*) is a diagram showing the closed state of the link mechanism.

In FIG. 15(*a*), the “closed state” of the link mechanism 11D is a state in which the lower link plate 50C and the upper link plate 50 are folded, and is defined as a state in which an angle made between the lower link plate 50C and the upper link plate 50 is an acute angle close to 0°. In the “closed state” of the link mechanism 11D, the link shaft 40A is placed above the rail 13 while the link shaft 40B is placed above the rail 14.

In the “closed state” of the link mechanism 11D, the pitch between the film holders 21 of the link mechanisms 11D adjacent to each other is the smallest.

And, in the “closed state” of the link mechanism 11D descried above, the rotation axis of the roller 90 is orthogonal to the extension directions of the rail 13 and the rail 14 as shown in FIG. 11(*a*).

As a result, even when the roller 90 and the link retainer (not shown) contact with each other during the running of the link mechanism 11D on the rail 13 and the rail 14, the risk of the occurrence of wear debris can be reduced since the contact between the roller 90 and the link retainer is “rolling”.

Next, FIG. 15(*b*) is a diagram showing the open state of the link mechanism.

In FIG. 15(*b*), the “open state” of the link mechanism 11D is a state in which the lower link plate 50C and the upper link plate 50 are open, and is defined as a state in which the angle made between the lower link plate 50C and the upper link plate 50 is close to 90°.

As shown in FIG. 15(*b*), in the link mechanism 11D, the link shaft 40A is placed above the rail 13 while the link shaft 40B is placed above the rail 14 in not only the “closed state” but also the “open state”.

In the “open state” of the link mechanism 11D, the pitch between the film holders 21 of the link mechanisms 11B adjacent to each other is the largest.

However, in the “open state” of the link mechanism 11D described above, the rotation axis of the roller 90 is not orthogonal to the extension directions of the rail 13 and the rail 14 as shown in FIG. 15(*b*). That is, when the roller 90 is fixed to the upper link plate 50 so that the rotation axis of the roller 90 in the “closed state” of the link mechanism 11D is orthogonal to the extension directions of the rail 13 and the rail 14 as shown in FIG. 15(*a*), the rotation axis of the roller 90 in the “open state” of the link mechanism 11D is not orthogonal to the extension directions of the rail 13 and the rail 14 due to the change in the angle made between the upper link plate 50 and the lower link plate 50C.

Accordingly, in the “open state” of the link mechanism 11D, when the roller 90 and the link retainer (not shown) contact with each other during the running of the link mechanism 11D on the rail 13 and the rail 14, the risk of the occurrence of wear debris cannot be reduced since the contact mode between the roller 90 and the link retainer is not “rolling” but “sliding”.

Therefore, even in the link mechanism 11D, in the configuration where the rotatable roller 90 is fixed to the upper link plate 50, the contact mode between the roller 90 and the link retainer cannot be set to “rolling” in both the “closed state” and the “open state” of the link mechanism 11D since the rotation axis of the roller 90 in both the “closed state” and the “open state” of the link mechanism 11D is not orthogonal to the extension directions of the rail 13 and the rail 14.

Thus, even in the second embodiment, the same devisal as that of the first embodiment has been made.

Features of Second Embodiment

Figure 16:
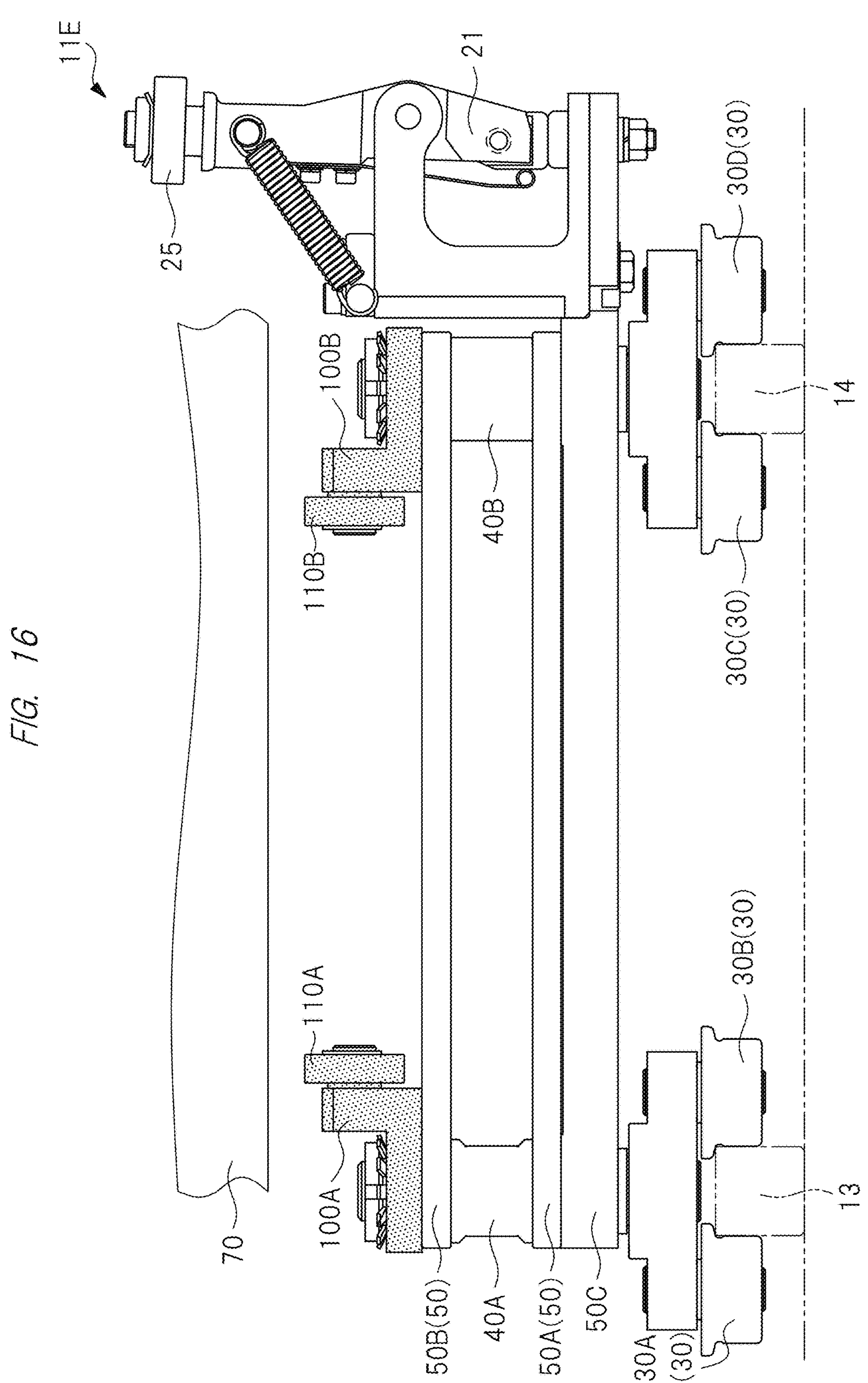
FIG. 16 is a diagram showing a link mechanism in a second embodiment.

As features of the second embodiment, for example, as shown in FIG. 16, a link mechanism 11E includes the roller 110A attached to the bracket 100A fixed to the link shaft 40A, and also includes the roller 110B attached to the bracket 100B fixed to the link shaft 40B.

Accordingly, even in the second embodiment, the rotation axes of the roller 110A and the roller 110B can be configured to be orthogonal to the extension directions of the rail 13 and the rail 14 in both the “closed state” and the “open state” of the link mechanism 11E.

The following is explanation about a configuration of the link mechanism 11E allowing the rotation axes of the roller 110A and the roller 110B to be orthogonal to the extension directions of the rail 13 and the rail 14 in both the “closed state” and the “open state” of the link mechanism 11E.

Figure 17:
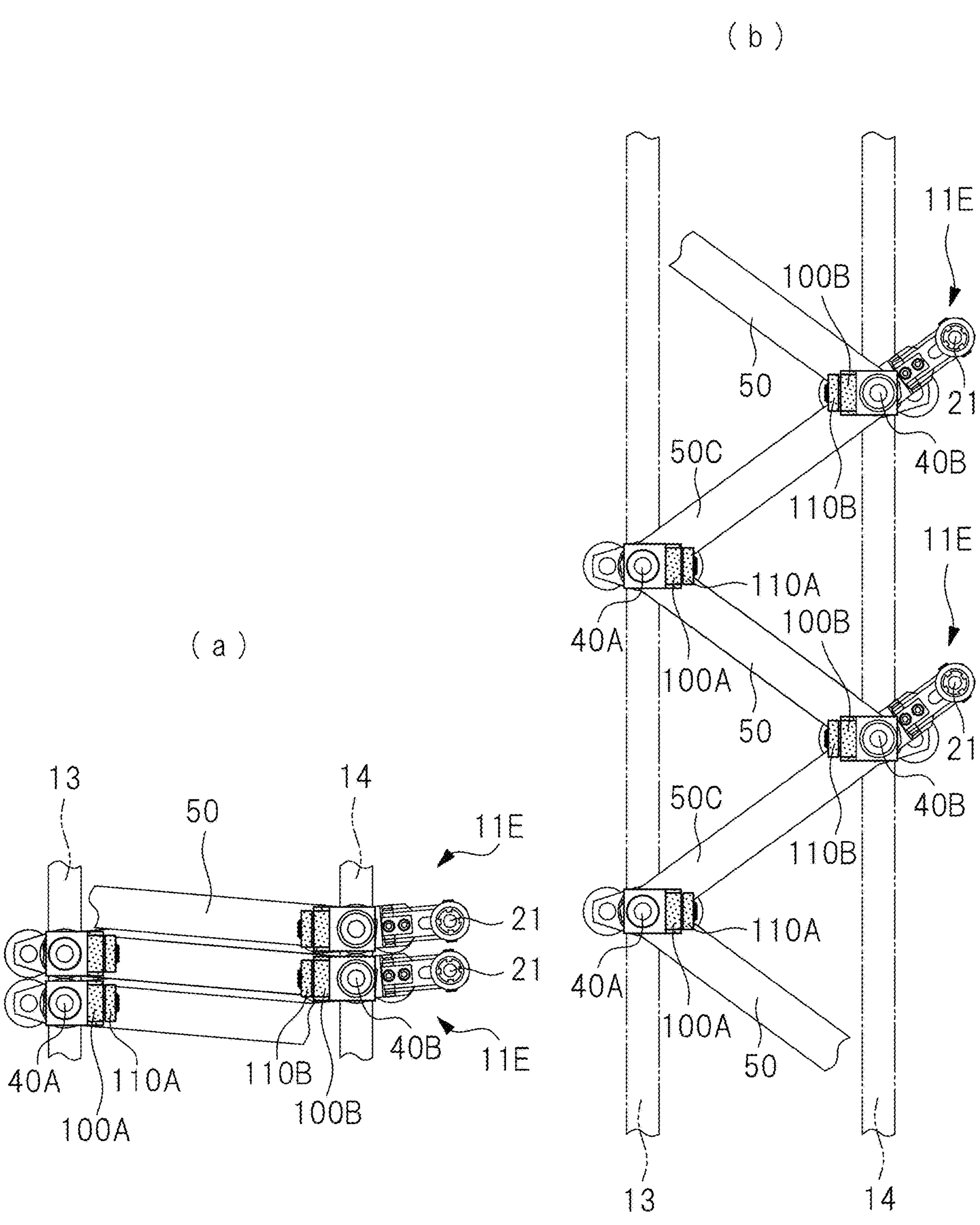
FIG. 17(*a*) is a diagram showing a closed state of a link mechanism, and FIG. 17(*b*) is a diagram showing an open state of the link mechanism.

FIG. 17(*a*) is a diagram showing the closed state of the link mechanism.

In FIG. 17(*a*), in the "closed state" of the link mechanism 11E, the pitch between the film holders 21 of the link mechanisms 11E adjacent to each other is the smallest.

And, in the "closed state" of the link mechanism 11E, as shown in FIG. 17(*a*), the rotation axes of the roller 110A and the roller 110B are orthogonal to the extension directions of the rail 13 and the rail 14 (extension direction of the pair of rails).

As a result, even when the rollers (110A, 110B) and the link retainer (not shown) contact with each other during the running of the link mechanism 11E on the rail 13 and the rail 14, the risk of the occurrence of wear debris can be reduced since the contact mode between the rollers (110A, 110B) and the link retainer is "rolling".

Next, FIG. 17(*b*) is a diagram showing the open state of the link mechanism.

In FIG. 17(*b*), in the "open state" of the link mechanism 11E, the pitch between the film holders 21 of the link mechanisms 11C adjacent to each other is the largest.

And, even in the "open state" of the link mechanism 11E, the rotation axes of the roller 110A and the roller 110B are orthogonal to the extension directions of the rail 13 and the rail 14 (extension direction of the pair of rails) as shown in FIG. 17(*b*). This is because, also in the link mechanism 11E in the second embodiment, the roller 110A and the roller 110B are not fixed to the upper link plate 50, but the roller 110A is fixed to the link shaft 40A via the bracket 100A while the roller 110B is fixed to the link shaft 40B via the bracket 100B.

For example, if the roller 110A and the roller 110B are fixed to the upper link plate 50, the rotation axes of the roller 110A and the roller 110B in the "open state" of the link mechanism 11E are not orthogonal to the extension directions of the rail 13 and the rail 14, due to the change in the angle made between the upper link plate 50 and the lower link plate 50C.

On the other hand, in the second embodiment, the roller 110A and the roller 110B are not fixed to the upper link plate 50, but the roller 110A contactable with the link retainer 70 is fixed to the bracket 100A fixed to the link shaft 40A while the roller 110B contactable with the link retainer 70 is fixed to the bracket 100B fixed to the link shaft 40B. For this reason, the configuration according to the link mechanism 11E allows the rotation axes of the roller 110A and the roller 110B to be orthogonal to the extension directions of the rail 13 and the rail 14 in not only the "closed state" but also the "open state" of the link mechanism 11E without being affected by the change in the angle made between the upper link plate 50 and the lower link plate 50C. Therefore, according to the features of the second embodiment, the contact mode between the rollers 110A, 110B and the link retainer 70 can be set to "rolling" in both the "closed state" and the "open state" of the link mechanism 11E. For this reason, according to the second embodiment, the occurrence of wear debris can be reduced.

Advantages of Link Mechanism 11E

The link mechanism 11E has the following advantages.

For example, as shown in FIG. 17(*a*) and FIG. 17(*b*), in the link mechanism 11E, the difference between the pitch between the link mechanisms 11E adjacent to each other in the "closed state" and the pitch between the link mechanisms 11E adjacent to each other in the "open state" can be made large. That is, the link mechanism 11E is advantageous in that a ratio (magnification) between the pitch in the "closed state" and the pitch in the "open state" can be made large. Further, the configuration of the link mechanism 11E is also advantageous in that the cost is low. The link mechanism 11E having such advantages is used in a manufacturing process for, for example, a lithium-ion battery separator.

In the foregoing, the invention made by the inventors of the present application has been concretely described on the basis of the embodiments. However, it is needless to say that the present invention is not limited to the foregoing embodiments, and various modifications can be made within the scope of the present invention.

REFERENCE SIGNS LIST

1: Film manufacturing system
2: Extruder
2*a*: Raw material supply unit
3: T-die
4: Raw fabric cooler
5: Stretch apparatus
6: Reeler
7: Winder
8: Film
9: Heat process unit
10: Link apparatus
10L: Link apparatus
10R: Link apparatus
11: Link mechanism
11A: Link mechanism
11B: Link mechanism
11C: Link mechanism
11D: Link mechanism
11E: Link mechanism
13: Rail
14: Rail
15: Sprocket
16: Sprocket
17: Sprocket
20A: Region
20B: Region
20C: Region
21: Film holder
25: Guide plate receiving roller
30A: Running guide roller
30B: Running guide roller
30C: Running guide roller
30D: Running guide roller
40A: Link shaft
40B: Link shaft
50: Upper link plate
50A: Upper link plate
50B: Upper link plate
50C: Lower link plate
60: Guide plate
70: Link retainer
80: Sliding part
90: Roller
100A: Bracket
100B: Bracket
110A: Roller
110B: Roller

The invention claimed is:

1. A resin-film stretch apparatus comprising:

a pair of rails;

a link retainer; and a link mechanism moveable on the pair of rails to hold a resin film, wherein the link mechanism includes:

a film holder holding a film;

a first link shaft linked to the film holder;

a second link shaft linked to the first link shaft;

a lower link plate linking the first link shaft and the second link shaft;

an upper link plate linking the first link shaft and the second link shaft;

a first bracket fixed to the first link shaft;

a second bracket fixed to the second link shaft;

a first roller attached to the first bracket and configured to contact with the link retainer; and a second roller attached to the second bracket and configured to contact with the link retainer, wherein the contact of the first and second rollers with the link retainer is configured to suppress lifting of the link mechanism from the pair of rails upon release of the resin film from the film holder.

2. The resin-film stretch apparatus according to claim 1, wherein an open state of the link mechanism is a state in which the first link shaft and the second link shaft are placed to be parallel to extension directions of the pair of rails, and a closed state of the link mechanism is a state in which the first link shaft and the second link shaft are placed to intersect the extension directions of the pair of rails.

3. The resin-film stretch apparatus according to claim 2, wherein, in both the open and closed states of the link mechanism, a rotation axis of the first roller and the extension directions of the pair of rails are orthogonal to each other, and a rotation axis of the second roller and the extension directions of the pair of rails are orthogonal to each other.

4. The resin-film stretch apparatus according to claim 1, wherein either one of the first link shaft and the second link shaft is placed above either one of the pair of rails in both the open and closed states of the link mechanism, and the other of the first link shaft and the second link shaft is placed at a position shifting from above the pair of rails in the closed state of the link mechanism.

5. The resin-film stretch apparatus according to claim 1, wherein the first link shaft is placed above one of the rails in both open and closed states of the link mechanism, and the second link shaft is placed above the other of the rails in both the open and closed states of the link mechanism.

6. The resin-film stretch apparatus according to claim 1, wherein the stretch apparatus is a simultaneous biaxial stretch apparatus.

* * * * *